United States Patent
Thieltges

[19]

[11] Patent Number: 6,149,112
[45] Date of Patent: Nov. 21, 2000

[54] MOTION STABLE CAMERA SUPPORT SYSTEM

[76] Inventor: Gary P. Thieltges, 2214 Panorama Ter., Los Angeles, Calif. 90039

[21] Appl. No.: 09/381,110

[22] PCT Filed: Mar. 27, 1998

[86] PCT No.: PCT/US98/06122

§ 371 Date: Sep. 15, 1999

§ 102(e) Date: Sep. 15, 1999

[87] PCT Pub. No.: WO98/44287

PCT Pub. Date: Oct. 8, 1998

Related U.S. Application Data

[60] Provisional application No. 60/058,711, Sep. 12, 1997, and provisional application No. 60/042,089, Mar. 28, 1997.

[51] Int. Cl.⁷ ............................. F16M 11/04; G03B 17/00
[52] U.S. Cl. .................................. 248/178.1; 248/278.1; 224/908; 396/428
[58] Field of Search ............................. 248/178.1, 276.1, 248/278.1; 224/901.2, 902, 908; 396/419, 428; 352/243

[56] References Cited

U.S. PATENT DOCUMENTS

| | | | |
|---|---|---|---|
| 625,032 | 5/1899 | Homan | 248/278.1 |
| 2,330,335 | 9/1943 | Collins | 248/278.1 |
| 2,369,829 | 2/1945 | Johnson . | |
| 2,659,266 | 11/1953 | Swisher | 248/276.1 |
| 4,158,489 | 6/1979 | Gottschalk | 352/243 |
| 4,474,439 | 10/1984 | Brown | 352/243 |
| 5,028,997 | 7/1991 | Elberbaum | 358/108 |
| 5,276,949 | 1/1994 | Cordellini | 24/569 |

OTHER PUBLICATIONS

USPTO, International Search Report in PCT/US 99/06122; Jul. 22, 1998.
USPTO, International Preliminary Examination Report in PCT/US 99/06122; Aug. 12, 1999.

*Primary Examiner*—Anita M. King
*Attorney, Agent, or Firm*—Christie, Parker & Hale, LLP

[57] ABSTRACT

A portable camera support system (10) has a tubular main support body (14) extending along a generally vertical axis between an upper end (18) and a lower end (16) for movably supporting a motion picture camera (12). The support system (10) is adapted for operational use supporting the camera (12) in both a lower camera mode of operation and an upper camera mode of operation. In the lower mode, a camera yoke assembly (54) is pivotally coupled to the lower end (16) of the main support body (14) and maintained at the lowermost position. The yoke assembly (54) is adapted to pivotally support the camera (12) about its sides and thus eliminate the traditional base mounting. A power supply assembly (38) and operator handle (48) are supported along the length of the main support body (14). The system (10) is balanced so that the handle (48) is aligned with the center of gravity of the components. A camera cage support system (104) also supports the camera (12) from the sides without need for a base support. The support cage (104) is fitted with connecting pins (130) for attachment with support rods (150) and brackets (106) to support the camera (12). Specialized clamps (165) are used with the support cage (104) and associated hardware.

27 Claims, 16 Drawing Sheets

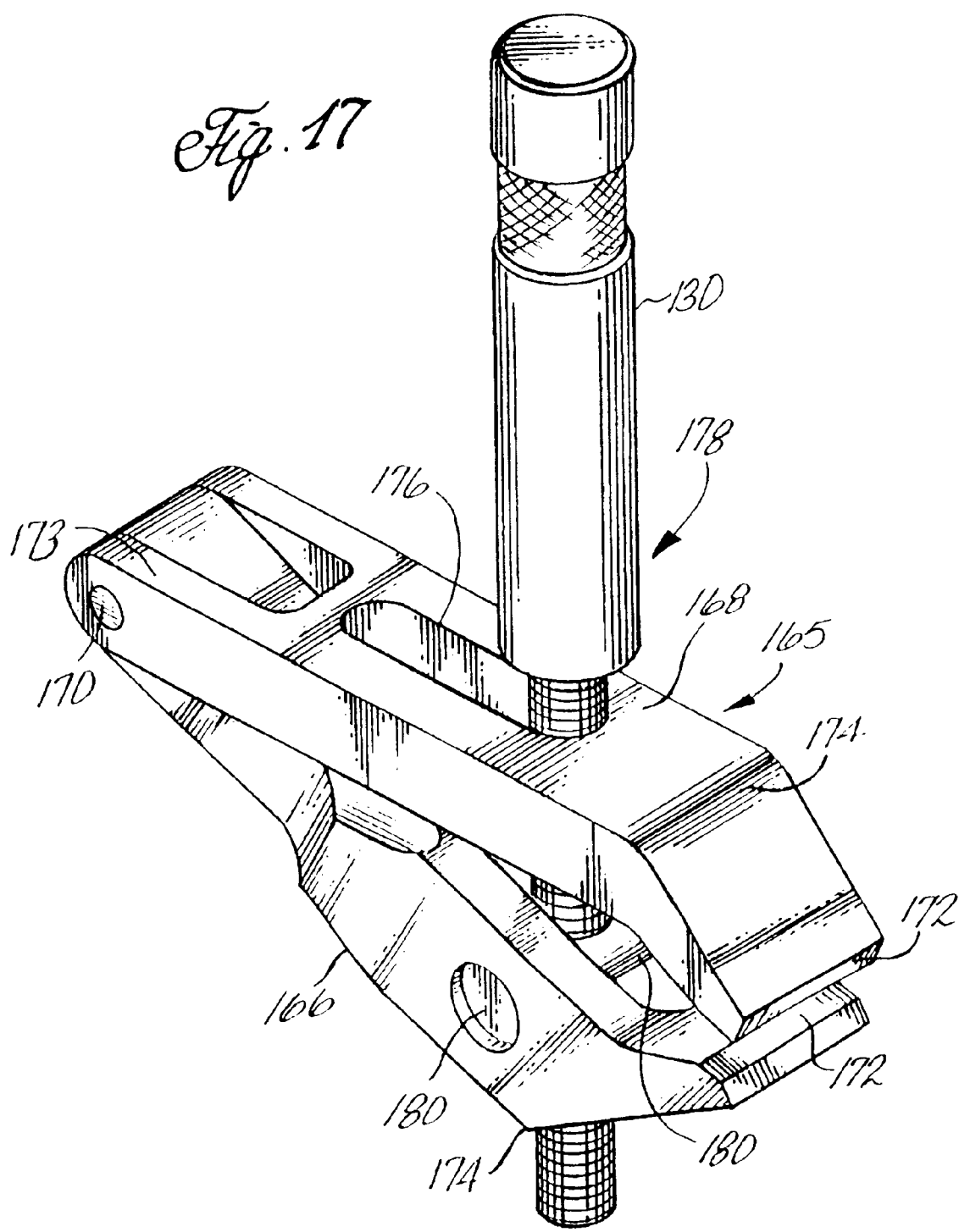

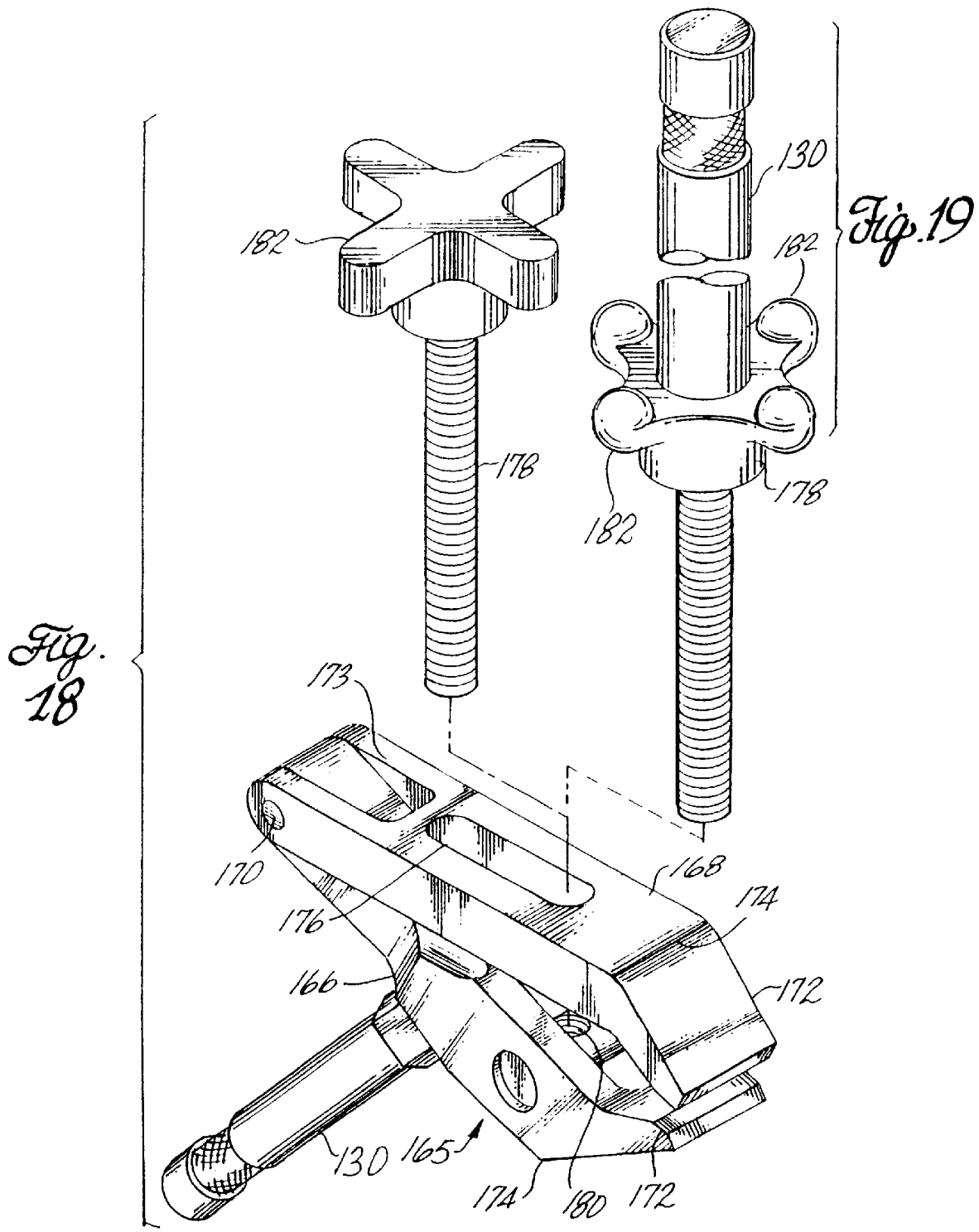

MOTION STABLE CAMERA SUPPORT SYSTEM

CROSS REFERENCE TO RELATED APPLICATIONS

This application claims the benefit of U.S. Provisional Application No. 60/058,711, filed on Sep. 12, 1997, and U.S. Provisional Application No. 60/042,089, filed on Mar. 28, 1997.

FIELD OF THE INVENTION

This invention relates generally to support systems for use with cameras and more particularly, to a portable support system useful with various sized and configured motion picture cameras which provides improved operating characteristics and allows filming access to locations where traditional motion picture cameras cannot conveniently be used.

BACKGROUND OF THE INVENTION

In the motion picture industry, motion picture cameras are often maintained in filming position through a support system or platform. For relative fixed filming, the camera may be supported on a dolly. To enhance camera mobility, the dolly may be mounted on wheels or tracks. However, these dolly type camera support systems are only suitable for limited mobility and filming operations. To enhance portability of the camera and to free the camera from these dolly type support systems during filming, a number of portable camera support systems have been designed.

One of these portable camera support systems is designed to allow smooth and steady movement of the supported camera through the use of a supportive vest worn by an operator. The systems generally consist of a central support pole with the camera mounted either above or below "a sled". The sled supports a battery power supply, a viewing screen and associated electronics. A support arm which consists of three joints with springs between them is attached to the vest. This arm absorbs movement from the body and isolates any movement from the support pole which is attached to the other end of the arm by means of a gimbal. The system is balanced by sliding the camera either forwards or backwards on a track. The camera is moved until a balanced interface point between the operator and the system is located at the appropriate place on the support pole with the aid of the gimbal.

While functional, these steady camera type support systems have several disadvantages. For example, the range of vertical movement for the supported camera is very limited and is confined to the approximate vertical range of between 18 to 24 inches. In addition, these support systems do not allow for the camera to tilt without tilting the entire support system which takes away much of the system's desired stability.

Support systems designed primarily for maintaining a steady camera are also very heavy and generally require extensive training and practice before an operator can become proficient in their use. The weight limits operator movement with a camera to the pace of a quick walk which in turn, limits the camera tracking capability to relatively slow moving objects. In addition, the setup time for these type of camera support systems is relatively extensive and the cost is quite expensive.

A second type of mobile camera support systems are based on the use of a spring-wound camera known as "The Eymo". Although these Eymo type systems are lighter in weight and more mobile than the steady type support systems, they also have several severe drawbacks. For example, the Eymo is a non-reflex camera which does not allow the camera operator to view the frame line of the image being photographed. This lack of precise framing is rarely acceptable in a professional setting. In addition, the camera lenses which can be used with a Eymo type camera and support system are limited in number and are not of the highest optical quality. The camera used in this system is also generally limited to 100 foot spools of film which are not readily available.

It is seen, therefore, that a need exists for a portable camera support system which will accept and be useable with a range of reflex-type motion picture camera and lens systems of the kinds conventionally used in the motion picture industry. There is also a need for such a system to provide acceptable camera stability when being moved and which is versatile in terms of the range of camera positions possible. The portable camera support system should also be light in weight and useable without extensive training and should also be structurally simple so that it can be purchased or rented at comparatively low cost.

An additional disadvantage of the available camera support systems is their limited adaptability for supporting a camera on a moving vehicle. In fact, the number of realistic camera placement positions on a moving vehicle is quite limited because of the inherent bulky nature of the automobile-attachable camera support platforms and systems. Currently, mounting a motion picture camera to an automobile or other moving vehicle entails a significant amount of time, effort, and talent to properly secure the camera. With an automobile, a camera platform is typically mounted across the hood. Alternatively, camera platforms are attached to either the driver-side door or the passenger-side door of the vehicle. The camera is then secured to the platform for filming. The major disadvantage of these currently used systems is the size and weight of the platforms as well as the time required for set-up and tear-down. These size and weight limitations of the camera and support system requires that the vehicle be of a minimum size and overall weight and thus, restricts the types of vehicles which can be used.

It is therefore seen, that there is also a need for a portable camera support system which can support standard as well as specially adapted motion picture cameras relative to a vehicle or other supporting foundation. The camera support system should provide acceptable camera stability when the vehicle is moved and be positionable at a number of different locations on the moving vehicle in a relatively short period of time.

SUMMARY OF THE INVENTION

The present invention overcomes the aforementioned problems by providing a portable support system having an elongated main support body extending along a generally vertical axis between an upper end and a lower end and adapted for supporting a dynamic image camera during filming and other camera operations. The portable support system is adapted for supporting a camera in both a lower camera mode of operation and an upper camera mode of operation. In the lower mode, a camera yoke assembly is pivotally coupled to the lower end of the main support body and maintained at a lowermost position. The yoke assembly is adapted to pivotally support a camera about a mounting axis passing through both sides of the camera body perpendicular to the camera lens axis.

Traditionally, the method of mounting or supporting a camera is from its base. This typically requires two materially strong and necessarily heavy interfaces. However, the present camera support system mounts to the camera through mounting attachments fixed on either side of the camera as opposed to the bottom. The mounting attachments are aligned along the mounting axis passing through the sides of the camera to allow turning of the camera about this axis. This configuration eliminates the need or weight of a mounting plate while allowing independent tilt and pan adjustments. The mounting attachments are angularly adjustable pickup points or pivot joint elements which are secured to each side of the camera body, perpendicular to the film plane. These pivot joint elements are coupled to mating pivot joint elements mounted on the yoke arms between which the camera is located. The opposing pivot joint elements are mateably coupled through a fastener which passes through their centers and acts as a pivot axis which allows the camera to be tilted without tilting the entire camera support system, as is inherently required by bottom mounted camera systems. The fasteners are aligned along the mounting axis passing through the sides of the camera. Tightening of these fasteners fixes the pivot joint elements in a fixed angular relationship and fixes the position of the camera relative to the yoke.

The yoke is pivotally attached to the main support body through a pair of angularly adjustable mating joint elements. One joint element being fixed to the main support and the mateably opposing joint element being fixed to the yoke. This double jointed system (pivot joints at the sides of the camera and at the yoke/main support junction) provides the advantage of providing the capability of adjusting the position of the camera and its lens and accessories relative to the main support body so that the center of gravity of the yoke-mounted equipment is on the axis of the main support body. A power supply assembly, including a battery and control panel assembly is also carried on the main support body. This power supply provides power to the camera for camera operations as well as to any other accessories or drive connected to the main support. An adjustably positionable handle is supported and positioned appropriately along the main support body at a balance point between the weight of the components. The combination of three pivot joints allows the operator to hold the camera support system through the operator support handle located at the balance point of the overall support system and components or at a location which is well above that balance point or even somewhere in between.

The camera support system can be moved from the lower mode with the camera located at the bottom of the main support body to the upper mode with the camera located at the top of the main support body by turning the system end for end and making suitable pivot adjustments at each of the two or three pivot joints. In either mode of operation, the operator support handle can be located for a pendulum type balance of the system. This type of balance achieves camera stability due to the effects of gravity on the system. Also, in either operational mode, the location of the operator support handle can be moved to a position along the main support just above the system balance point for other camera movement situations.

In another aspect of the present invention, a drive assembly is connected to each of the pivot joints coupling the camera to a yoke. The drive assembly allows an operator to automatically pivot or turn the camera about the mounting axis relative to the main support. The drive assembly includes a pair of drive motors, each of which is attached to a respective yoke arm. In addition, pivot joints between each of the respective camera and yoke arm interfaces is modified to include a turning gear. This turning gear is engaged with a drive gear on the respective motor. The motor is connected to the power supply system and a control switch is coupled to the handle.

In yet another aspect of the present invention, a camera cage support system is used to support a camera about the sides of the camera as previously described and thus, also eliminate the need for a bottom mount or support. The cage support system is an extended version of the yoke portion of the camera support system. The cage support is fitted with structural connection pins for connection with support rods, brackets and clamps. The support rods, brackets and clamps are used to support the camera cage support at most any location.

The cage support is a framed structure adapted for housing a motion picture camera. The camera is secured to the cage support through pickup points (joints) attached to opposing sides of the camera. The side mounted joints on the camera mateably attach to matching pivot joint portions attached to the inside of the cage-support. Once the motion picture camera is secured to the cage-support, the cage-support can be secured to a foundational support sufficient to provide the necessary stability to the camera system.

The cage has at least three attachment points into which the described structural connecting pins can be threadably secured. These connecting pins are adapters which allow the cage to be connected to support rods. The other end of the support rods are secured to an independent structural foundation (i.e., a motorcycle or automobile) and are capable of providing the stability necessary to allow the camera to capture sufficiently stable imagery. Specialized clamps may be used to secure the support rods to the foundational support.

This invention, together with the additional features and advantages thereof, which was only summarized in the foregoing passages, will become more apparent to those of skill in the art upon reading the description of the preferred embodiments, which follows in the specification, taken together with the following drawings.

BRIEF DESCRIPTION OF THE DRAWINGS

FIG. 17 is a perspective view of an embodiment of a camera support mounting clamp constructed according to the principles of the present invention;

FIG. 18 is a perspective view of the camera support clamp of FIG. 17 shown with an alternative tightening device; and FIG. 19 is a perspective view of the camera support clamp of FIG. 18 shown with a combination support pin tightening device.

DESCRIPTION OF THE PREFERRED EMBODIMENTS

Figure 1:
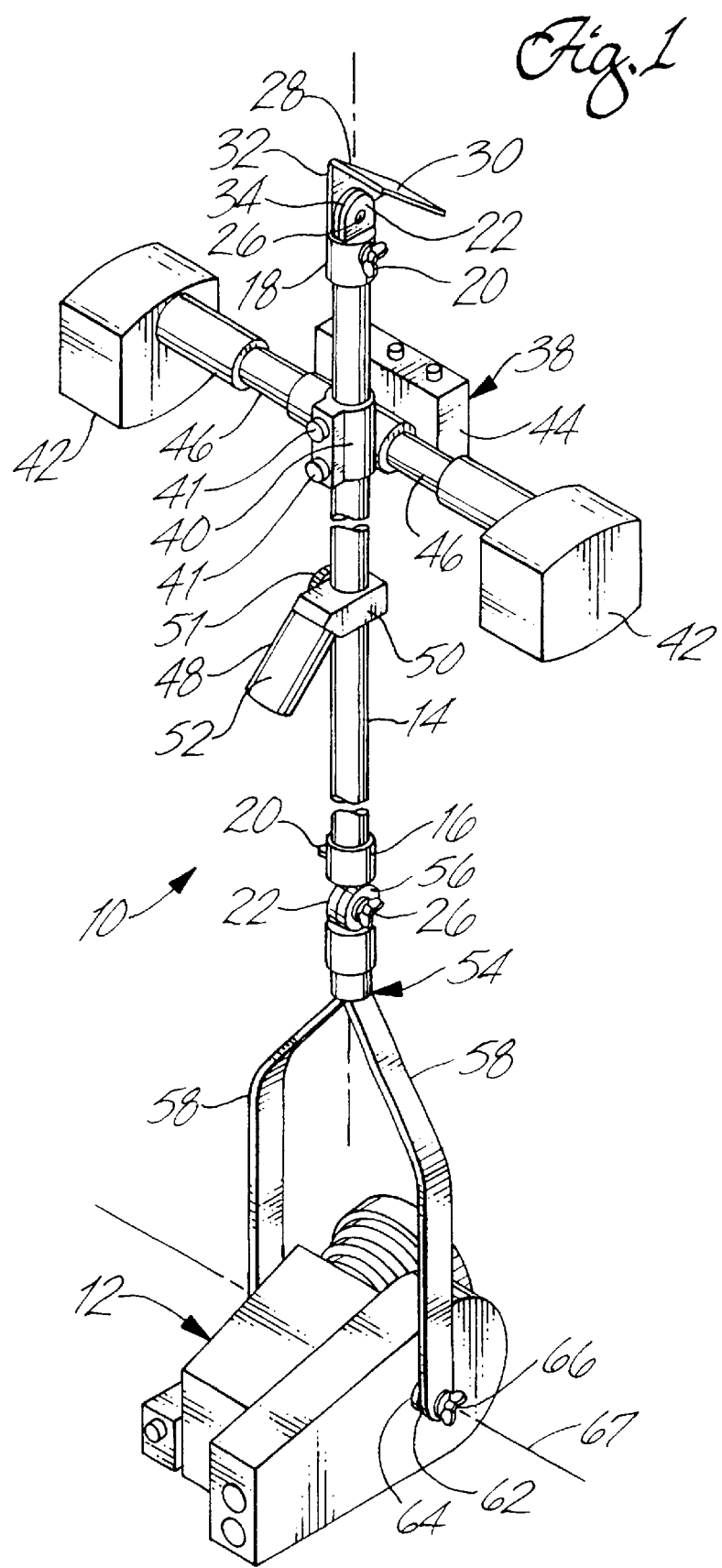
FIG. 1 is a fragmentary perspective view of a camera support system constructed according to the principles of the present invention and oriented in the "low position" mode.
Figure 2:
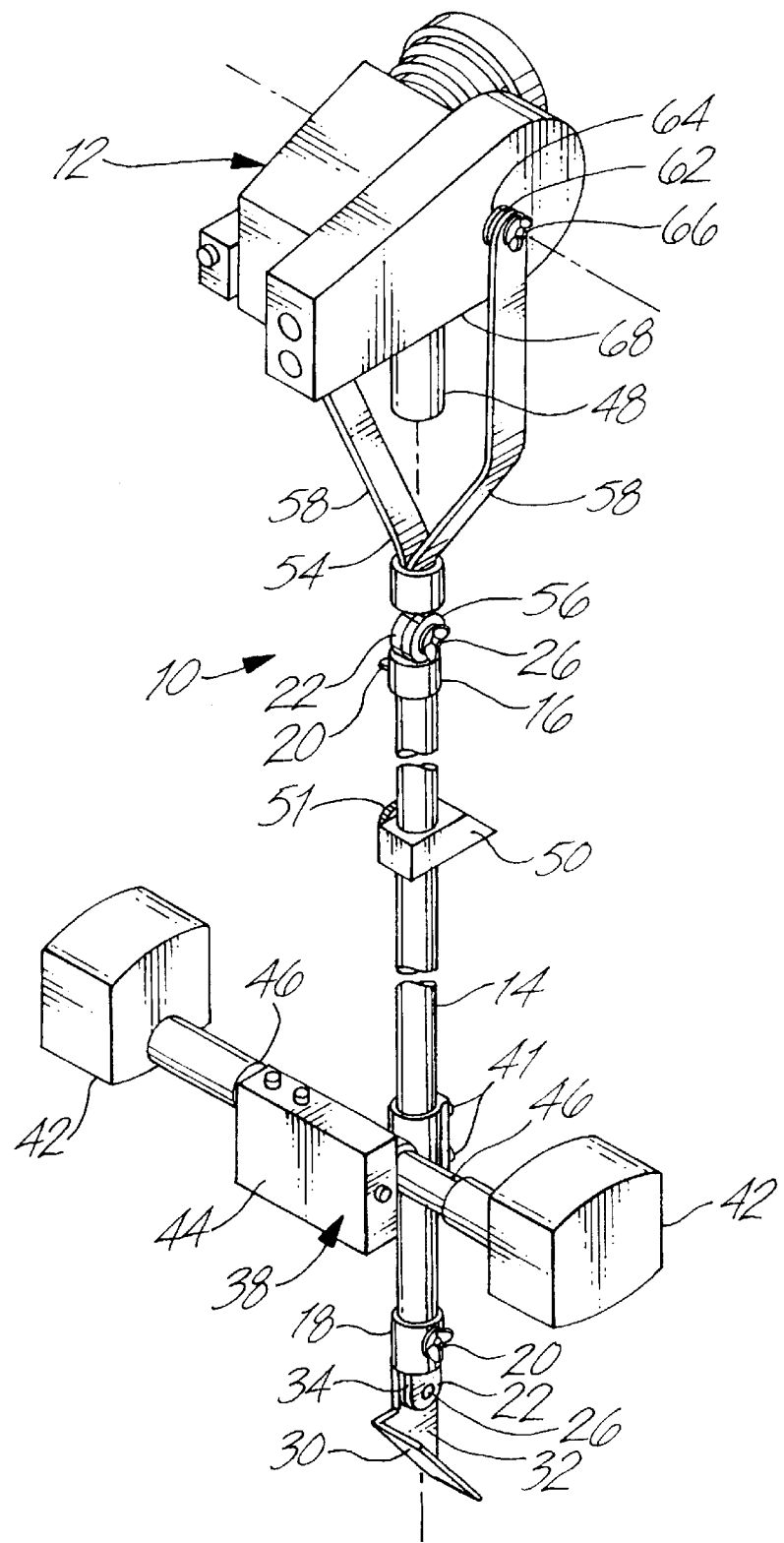
FIG. 2 is a fragmentary perspective view showing the camera support system of FIG. 1 oriented in the "upper position" mode.

Referring to the drawings, wherein like reference numerals designate identical or corresponding parts throughout the several views and embodiments, an exemplary embodiment of a camera support system provided according to the principles of the present invention is illustrated in FIGS. 1 and 2 and identified by reference numeral 10. As shown in FIG. 1, the support system 10 may be used to support a motion picture or dynamic image camera 12 at a lower end. During camera operation, this lower camera positioning is referred to as a "doggie" or "low position" mode. As shown in FIG. 2, the support system 10 may be used to support the motion picture camera 12 at an upper end. During camera 12 operation with the camera attached to the upper end, the camera 12 positioning is referred to as the "people" or "upper position" mode.

Referring in particular to FIG. 1, the support system 10 includes an elongated main support body 14 which extends between a lower attachment 16 and an upper attachment 18. The main support body 14 is preferably constructed from an elongate hollow tube or shaft of a lightweight structural material, such as a metal or a structural plastic, such as a fiberglass. More preferably, the main support 14 may be constructed from a tube of a high strength aluminum alloy, such as a 20–24 aluminum. The attachments 16 and 18 may also be made from a structural material and even a structural plastic. Preferably, the attachments 16 and 18 are constructed from a high strength aluminum alloy, such as a 20–24 aluminum.

Each of the attachments 16 and 18, are preferably identical and are fixed to the opposing ends of the main support body 14. As illustrated, the top and bottom attachments 16 and 18 are securely attached to the main support 14 by inserting the distal ends of the main support 14 into the open portions of the attachment ends 16 and 18 and using a fastener 20 to securely maintain the main support within each attachment end. This form of attachment is preferred because it allows lockable rotation of the attachment end 16 and 18. However, each attachment end 16 and 18 may be secured to the main support body 14 through any known means, such as welding or using mating threaded portions. If fixedly secured, the attachments 16 and 18 may be further fitted with lockably rotatable bodies to allow angular movement of the respective attachments relative to the main support 14 and to enable securement in any angular position.

Figure 3:
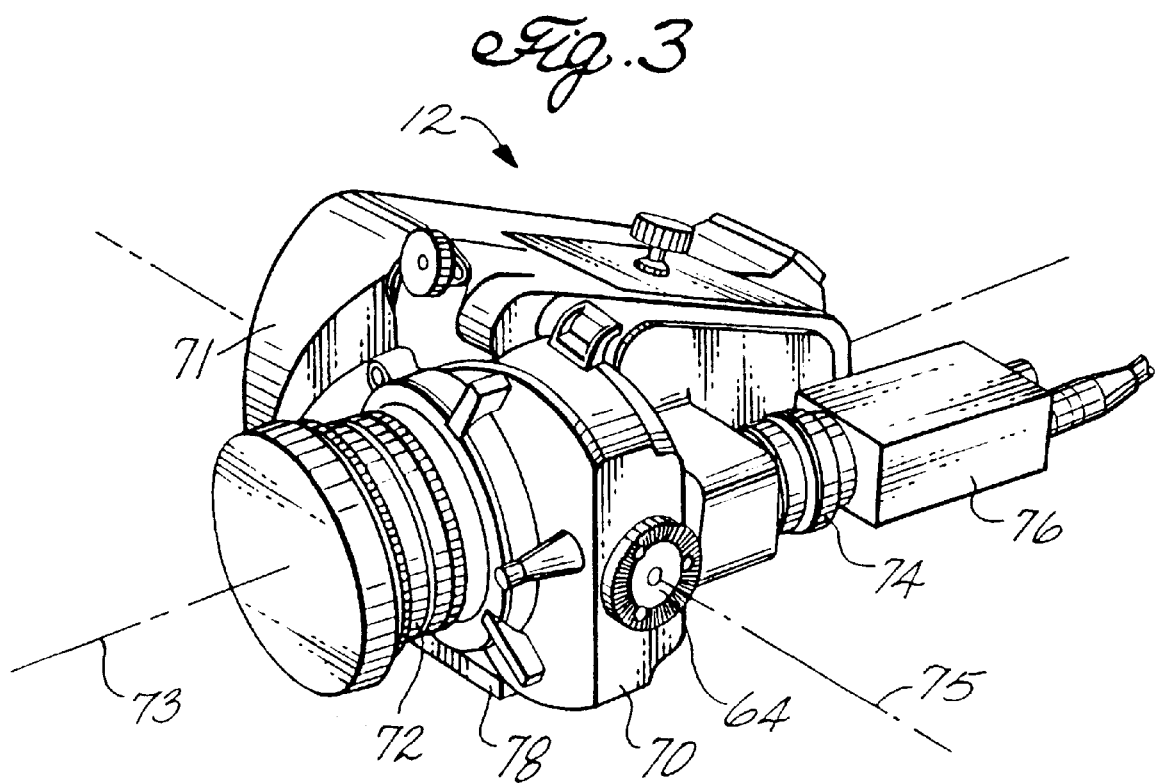
FIG. 3 is a perspective view showing a standard motion picture camera which has been modified to interface with the camera support system of FIGS. 1 and 2.

The distal portion of each attachment end 16 and 18 forms a portion of a pivotable joint. As illustrated, each of these pivotable joint portions forms a pivot joint element 22 or pivot surface. Preferably, the pivot joint element 22 is a rosette, star plate or similar structure having a partial circular disc including a preferably flat side with a featured surface 24 (FIG. 3). The featured surface defines a circular pattern of alternating radially extending crests and valleys of uniform contour. When the featured surface of the rosette 22 is mated against a coaxially aligned and opposing rosette, the two cannot be rotated or turned relative to each other due to the featured crests and valleys which engage like gear teeth. However, each rosette 22 can have as many angular positions relative to each other as there are crests or valleys on each of opposing the rosettes, which preferably are identical in their annular mating areas. The pivot joint element 22 is configured for mating with an opposing pivot joint element to securely attach a component and allow adjustable angle orientation relative to the main support body 14. Set through the center of the mating pivot joint elements 22 is an adjustable tightening screw 26 which allows passes through at least a portion of a mating pivot joint element to fixedly secure the attached component in a desired angular position.

Alternative devices may be used to accomplish the functions of the mating pivot joint elements 22. For example, any pivotal or joint device capable of coupling a component to the main support 14 and fixedly securing the component at various angular orientations may be used. This may include a clutch plate (opposing frictional pads) mounted on each opposing component and forcibly engageable with each other at any angular relation per a clamp mechanism operative upon the plates. Other devices may include lockable swivels, axle mounts extending from the main body 14 with cooperable clamp journals mounted on the attached component or any other locking pivotal device as known to those of skill in the art. A fixed orientation attachment may also be used as the upper end attachment 18, but this may limit the adjustability of the viewing monitor.

A viewer support mount 28 is secured to the upper attachment end 18. The viewer support mount 28 includes a flat surface 30 for supporting an operator monitor or other viewing device (not shown). The viewer support mount 28 is constructed with the flat surface 30 extending outwardly at an approximately ninety degree angle from a flange 32. The flat surface 30 is oriented at a tilt to allow convenient operator viewing of an attached monitor (not shown). Preferably, this tilt is approximately 45 degrees relative to a horizontal when the main support 14 and the support flange 32 are generally vertical. A mating pivot joint element 34 is attached to the support flange 32 to allow adjustable movement relative to the upper end attachment 18 on the main support 14. The two mating pivot joint elements 22 and 34 attached to the viewer support mount 28 and the upper attachment 18, respectively, mate together and are tightly secured by a tightening screw 26. In this manner the viewer support mount 28 is adjustably secured to the upper end attachment 18 which in turn is attached to the main support 14.

Rotating the upper attachment end 18 about the axis along the main support 14, allows the planer surface 30 to be orientating facing most any direction. Once the desired orientation is found, the upper attachment 18 may be secured to the main support 14 by tightening the attachment end fastener 20. Similarly, the tilt angle of the flat surface 30 can be adjusted by incrementally adjusting the two mating pivot joint elements 22 and 34, mounted to the viewer support mount 28 and the upper attachment 18, respectively. The desired tilt is secured by compressing the opposing pivot joint elements 22 and 34 together through the tightening screw 26. In this manner the video monitor can be adjusted to the operator's preferred position relative to the complete camera support system 10.

As discussed, the viewer support mount 28 is adapted for connection with a video monitor or other viewing device. Preferably, the flat surface 30 is covered with a velcro hook or pile material, e.g., to which an opposing hook or pile material attached to the viewing monitor can be secured. This allows the monitor to be quickly and removably secured to the viewer support mount 28. However, other methods of attachment may be used, such as clamps or even fasteners and the support mount 28 may be provided with such fasteners or holes and grooves for use with such fasteners. Preferably, the viewer support mount 28 and the end attachments 16 and 18 are made from a lightweight structural material. More preferably, the viewer support mount 28 and the end attachments 16 and 18 are made from an aluminum, such as a 60–64 aluminum. This aluminum provides strength and allows for efficient machining of the pivot joint element surfaces. However, other materials may also be used.

Located vertically below the upper attachment end 18 and viewer support mount 28 combination, along the main support 14, is a power supply assembly 38 which includes a securing bracket 40, batteries 42 and a control box 44. The securing bracket 40 is adapted for securing the power supply assembly 38 along the main support body 14. The illustrated securing bracket 40 includes a hollow portion with an inside diameter slightly larger than the outside diameter of the main support 14. This allows vertical adjustment of the power supply assembly 38 along the length of the main support 14. The power supply assembly 38 is releasably secured in a desired location on the main support 14 with the use of tightening fasteners 41.

A pair of support posts 46 extend outwardly from the support bracket 40. Each of the posts 46 is used to support a battery 42. To ensure proper balancing and center of gravity location, each of the posts 46 and batteries 42 are preferably the same. Alternatively, the posts 46 may be constructed from a single piece of tubing or other structural material. Preferably, the posts 46 are constructed from a lightweight tubing, such as an aluminum tubing. The distal end of each post 46 is adapted to releasably support one of the batteries 42.

The batteries 42 may be any battery which provides sufficient power to operate the desired camera 12. Power tool rechargeable battery units, such as 12 volt batteries used for power drills, have been found to serve well as battery units in the present camera support system 10. As illustrated, the batteries 42 have been modified to physically slide into the end portions of the horizontal posts 46. The posts 46 are each fitted with an electrical connector (not shown) for engaging with the connection on each battery 42. This connection in turn, is directed to the control box 44. Thus, the batteries 42 are connected to the power control box 44 by appropriate connectors, wire or otherwise. The control box 44 is attached to the horizontal post 46 in a manner consistent with symmetry. The outer side edges of the control box 46 are located an equidistance from the axis of the main support 14. Likewise, the top and bottom edges of the control box 44 are located an equidistance from the axis of the horizontal post 46. Thus, in order for an operator to power up the support system 10, he merely needs to connect the power supplied at the control box 44 to the attached camera 12 and the video viewing system (not shown), if necessary. Such connections can be made with electrical cables as readily known and commercially available.

The power supply assembly 38 can remain in the same secured position regardless of whether the camera is positioned for operation in the "low" mode as shown in FIG. 1 or in the "high" mode as shown in FIG. 2. This allows simplicity in set-up when changing from operational modes. However, the position of the power supply system 38 may also be adjusted along the length of the main support 14 to alter or shift the position of the center of gravity of the overall camera support system 10.

A handle 48 is attached to the main support 14. The handle 48 is adapted to facilitate one handed operation of the camera support system 10 and camera 12 assembly, including filming operations. Thus, the handle 48 is positioned relative to the center of gravity of the entire system (the camera support system 10, including the attached camera 12). Preferably, the handle 48 is secured along the main support 14 somewhere below, depending upon the location of the system balance point, the power supply assembly 38. As illustrated, the handle 48 is attached to the main support 14 through a block 50 having a cylindrical bore with an inside diameter slightly larger than the outside diameter of the main support 14. The handle is secured in position through a removable fastener 51 which compresses the main support 14. This configuration allows vertical adjustment along the length of the main support 14 when the fastener 51 is relieved.

The handle 48 extends outwardly away from the main support 14 at an angle of approximately forty five degrees. This departure angle is adapted to properly orient the wrist and arm of the operator for filming and may be altered to most any angle desired. The handle 48 may be threaded to screw securely into the mounting block 50. A handle grip 52, such as a bicycle or motorcycle handlebar grip, may be provided to create a comfortable and non-slip surface. The handle grip 52 may be formed as part of the handle 48 or provided as a sleeve which slip fits over the handle. Preferably, the handle grip 52 is made of material sufficiently tacky to allow the operator to easily interface with the camera support system 10 without losing grip. When configured with a removable handle 48, multiple handles of varying diameters and configurations may be interchanged to match the desired handle size and shape for the operator.

In an alternative configuration (not shown), the handle 48 may be hinged at a point along the main support 14. The hinge would be lockable with a tightening screw or similar device at a point 180 degrees from the hinge. The handle grip 52 would fit onto the handle 48 as previously described. In both configurations, the operator is kept apart and completely separate from the camera support system 10.

Similar to the upper end attachment 18, the lower end attachment 16 is rotatably attached to the second end of the elongate main support 14. The lower end attachment 16 also includes a pivotable joint or pivot joint element 22 at its distal end. The lower end attachment 16 is coupled to a camera yoke assembly 54 in a similar fashion as the viewer support mount 28 is coupled to the upper end attachment 18 as previously described. This allows the camera yoke assembly 54 to be tilted incrementally consistent with the incrementally mateable positions of the pivot joint elements 22 attached to the lower end attachment 16 and the yoke, respectively.

The yoke 54 extends between a pivot joint element 56 at one end and a pair of yoke arms 58 at a second end. The pivot joint element 56 is mated with the opposing pivot joint element 22 at the distal end of the lower end attachment 16. Preferably, this pivotable joint assembly 56 and 22 comprises opposing and mating pivot joint elements as previously described. A tightening screw 26 passes through the center of the mating pivot joint elements 22 and 56 and secures them together in the desired angular position while coupling the yoke 54 to the rest of the camera support system 10. The pivot joint element 56 extends into the opposing yoke arms 58 which protrude out from the pivot joint element 56 at approximately a forty five degree angle from an axis generally along the main support 14. Both yoke arms 58 extend distally further and bend again at approximately a forty five degree angle to be substantially parallel to the axis through the main support 14. Alternatively, the yoke arms 58 may be curved to form a generally U-shaped or generally C-shaped structure. A second pivot joint element 62 is attached to the distal end of each yoke arm 58. Preferably, these second pivot joint elements 62 are similar to the pivot joint elements as previously described, and are threadably fastened, riveted or welded to the inside of each yoke arm 58. The pivot joint elements 62 on the yoke arms 58 are thus, aligned and opposing each other along a common mount axis 67.

Figure 4:
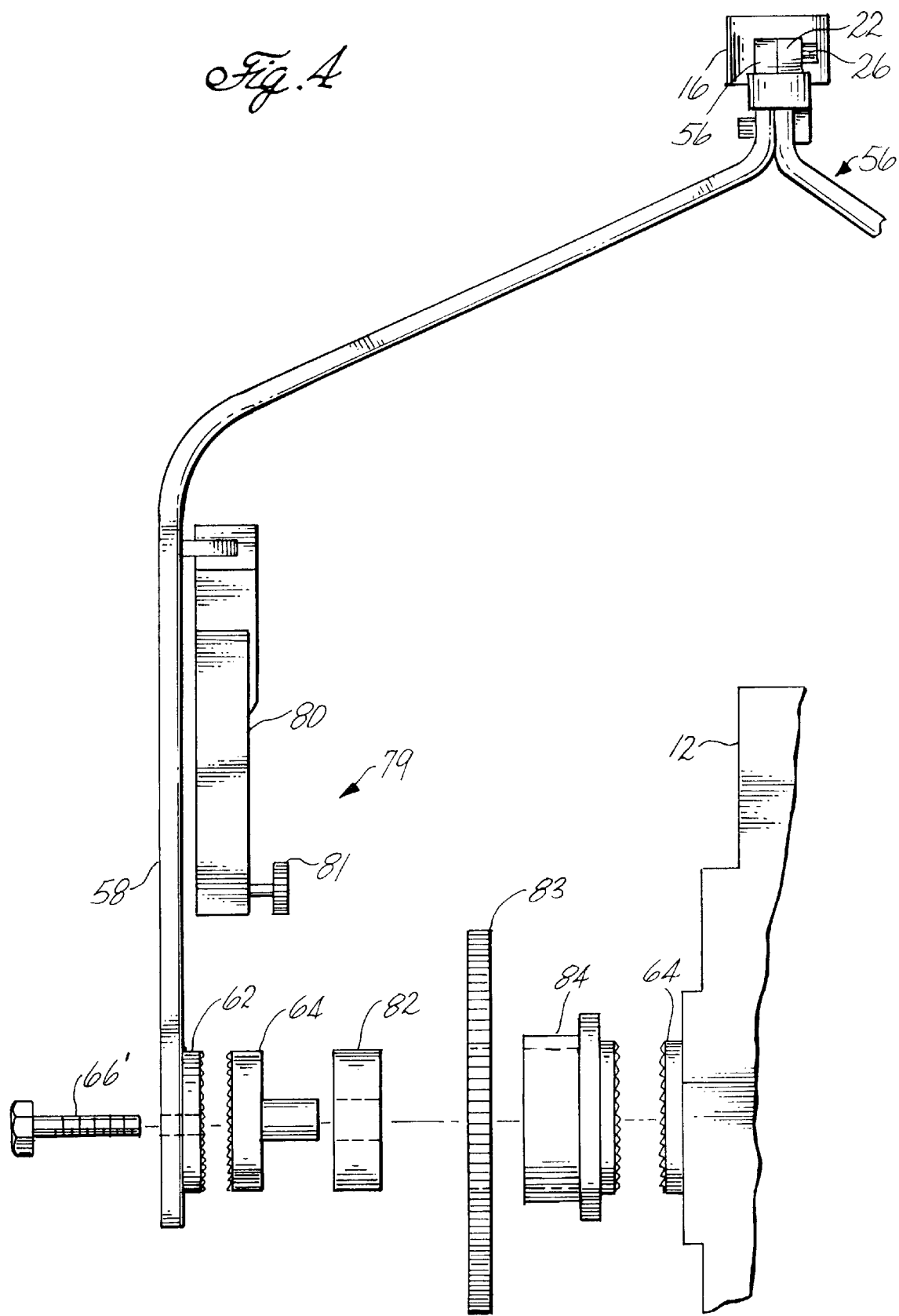
FIG. 4 is an exploded partial view of a motorized camera angular drive assembly for use with the camera support system.

The spacing between the yoke arms 58, plus the width of the attached pivot joints 62, is slightly larger than the width of the camera 12. The width of the camera 12 includes the width of a pair of pivot joint elements or pivot joint elements 64 which can mate with the pivot joint elements 62 on the yoke arms 58. The pivot joint elements 64 mounted to the camera 12 are each secured to opposing sides of the camera and aligned, more or less, along a horizontal balance point axis of the camera. The spacing between the opposing yoke pivot joint elements 62 is thus, sufficient to allow the camera 12, including its attached pivot joint elements 64, to be easily inserted therebetween. The camera 12 may then be aligned and connected by mating the respective opposing pivot joint elements 62 and 64 and securing tightening fasteners 66 with sufficient force to secure the camera 12 to the yoke arms 54. The tightening fasteners 66 pass through the center of the mating pivot joint elements 62 and 64 to provide angular pivoting about the mount axis 67. In addition, the pivot joint elements 64 and/or the sides of the camera 12 may be tapped for receiving the respective tightening fastener such as a winghead bolt 66 (FIG. 1, e.g.) or a conventional bolt 66' (FIG. 4).

The combination of the rotatably adjustable interface of the yoke 54 to the main support 14 and the rotatably adjustable interface of the camera 12 to the distal end of the yoke arms 58, allows the camera to be adjusted to capture a film plane parallel to the horizon while retaining alignment of the camera's and the system's center of gravity with the axis of the main support 14. The handle 48 may be attached to the main support 14 substantially at or slightly above the location on the main support 14 which corresponds to the system's center of gravity. This arrangement maintains the entire system's inherent stability.

Referring in particular, to FIG. 2, the camera support system 10 is shown configured and oriented in the "high position" mode. In this mode, the camera support system 10 is substantially structurally the same as when the support system is configured in the "low" mode. To switch from the "low" mode to the "high position" mode, the operator loosens the tightening fasteners 66 on either side of the camera 12 sufficiently to disengage the respective mated and opposing camera and yoke 54 pivot joint element 62 and 64. The camera 12 can then be rotated approximately 180 degrees around the camera/yoke pivot joint interface. The operator can then remate the opposing pivot joint elements 62 and 64 through the tightening screw 66 with sufficient force to prevent the camera 12 from rotating out of the mated pivot joint position chosen. The main support 14 may then be rotated around 180 degrees to place the camera 12 at an upper end of the support system 10. The handle 48 may be removed from the handle mounting block 50 and repositioned into a mounting support plate 68 on the camera 12.

Referring now to FIG. 3, an embodiment of a camera assembly 12 which may be used with the present camera support system 10 will be described in greater detail. The camera 12 is comprised of a camera body 70 (such as an ARRIFLEX IIC camera body) having a top, bottom and side surfaces, including a commercially available but non-standard camera drive 71. The camera drive 71 includes a compact motor and drive train for moving the film medium. The camera drive 71 couples to the bottom of the camera body via a low profile base and body receiver. The camera 12 also includes a lens assembly 72 which is coupled to the camera body 70 at an imaging lens location and along an optical axis 73 which extends through the body in a front-to-back direction from the imaging lens location. The lens 72 may be interchangeable with differing lenses as is known. The camera 12 also preferably includes an electronic video eyepiece 74 in place of an optical eyepiece. The camera 12 may also be equipped with a power driven focus accessory for the lens system 72 to allow an assistant-camera person to remotely adjust focus as necessary and as is also known.

The camera 12 may comprise a standard or conventional camera which has been modified or specially adapted to work with the camera support system 10 of the present invention. The modifications or adaptions include mounting opposing pivot joint elements 64 or as illustrated, pivot joint elements, on opposing sides of the camera body 70. As previously mentioned, these pivot joint elements 64 are preferably permanently mounted to respective opposite sides of the camera body 70 and aligned along a common horizontal axis 75 passing through the sides of the body. Preferably, this common horizontal axis 75 is substantially perpendicular to the optical axis 73. The pivot joint elements 64 may be made from machined pieces of a metal or plastic and are preferably made from circular pieces of aluminum. The pivot joint elements 64 may be secured to the camera through most any method known and are preferably secured to the camera body 70 through threaded fasteners or rivets.

In a preferred embodiment, the camera 12 preferably is an ARRIFLEX reflex camera with interchangeable lenses 72 which allow the user to mount any lens, that uses a standard mount, to the imaging lens location on the camera and thus, to the support system 10 of the present invention. The eyepiece of the camera 12 has been altered to include a video tap 76 (small video camera) which transmits the frame image to a viewer mounted on the viewer support mount 28. The video tap 76 may also be directed to any other off-board reception system for viewing by the director, client or other viewer.

The camera 12 may also be fitted with a conventional mounting support plate 78 on its bottom side. The mounting support plate 78 is adapted for connection with other types of camera support equipment, such as a tripod. Thus, the support plate 78 may be fitted with threaded holes, grooves and the like for connection with similarly aligned holes in the bottom side of the camera 12. Preferably, the support plate 78 is fastened to the base of the camera 12 and is fitted with threaded fastener holes is common in the motion picture industry.

Referring now, back to FIGS. 1 and 2, a characteristic of the camera support system 10 of the present invention is that it relies naturally on gravity to create stability. A simple understanding of how to balance the system 10 is all that is necessary to allow an operator to operate the system and to capture smooth and stable motion picture imagery. This configuration thus, minimizes the training required to understand and properly operate the system 10. The support system 10, including an attached camera 12, is also capable of being moved as quickly as an operator can physically run because of the lack of encumbrances and light weight. Since the system 10 is generally oriented vertically, it can move commonly with the operator. Because the camera 12 is secured to the yoke arms 58 along the camera sides, the camera 12 and particularly, the camera lens can be placed closer to the ground than previously allowed.

The pivotable yoke assembly 54 allows for connection with cameras of varying size and weight. This, in turn, allows the use of extremely light lenses or extremely heavy lenses. By turning the mating pivot joint elements 62 and 68 on the yoke arms 58 and camera 12 forward and tilting the pivot joint 56 on the lower end attachment 16 rearward, the support system 10 compensates for a heavier lens. This compensation effectively moves the center of gravity of the camera and lens system 12 to a location in line with the longitudinal axis of the main support 14. In addition, the support system 10 can be adjusted to tilt the camera 12 up or down about the camera's horizontal axis 75 through the side mounted pivot joint elements 62 and 64 without tilting the entire main support 14 forward or back at pivot point 56. This allows the system to maintain its inherent stability.

If a greater pendulum effect is desired (i.e., for when the camera swings wide around a corner), the handle can be adjusted well above the center of gravity or balance point of the system to create the greatest pendulum stabilization effect. Likewise, if the camera 12 needs to be moved quickly in an arc, the most advantageous position for the interface between the operator and system 10 is just at, or slightly above, the center of mass so that centrifugal forces act equally above and below the pickup point thereby increasing stability in the arc. Additionally, the 45 degree angle at which the handle 48 comes off the main support 14 gives a better ergonomic effect by providing a more natural angle of interface between the system 10 and operator. This added comfort and operation makes the system 10 more user friendly.

As briefly described above, the camera support system 10 supports a viewing monitor which is coupled to the eyepiece 74 to display the frame actually being filmed. A video transmitter may be incorporated to the support system 10 to broadcast the video image to a receiver station. This allows the director and/or client to see what is actually being photographed or filmed without the camera operator having to trail a video cable behind him. The video transmitter is also capable of broadcasting, or transmitting by cable, the video image to a viewer monitor mounted to the top of the camera support system 10. The viewer monitor allows the operator to see what the camera 12 is photographing while performing the routine functions of maneuvering the camera through the dynamics of a particular shot.

An additional beneficial feature of mounting the camera 12 along its sides is that the optical axis 73 of the camera 12 may quickly be adjusted relative to the main support 14 via the camera/yoke arm mating pivot joint elements 62 and 64 while substantially maintaining the camera's optical axis 73 alignment with the axis of the main support 14. Alignment of the camera's optical axis 73 with the axis of the main support 14 allows the camera 12 to be efficiently rolled or rotated about the camera's optical axis.

To facilitate the angular displacement of the camera 12 relative to the main body 14, a motor assembly may be incorporated into at least one of the pivot joints 62 and 64 on either side of the camera. The motor assembly may be actuated by the operator through actuation of a control switch mounted on the handle 48 or alternatively could be remotely handled. The motor assembly may be particularly advantageous in situations where an operator can not easily adjust the angle of the camera's optical axis 73 relative to the main body. For example, when the operator is moving the camera support 10 during filming and wants to adjust the angle of the camera 12 or alternatively, when the camera 12 is remotely mounted away from the operator access. In a similar fashion, a motor assembly may be incorporated into the pivot end 56 of the yoke assembly 54 to allow automatic or remote balancing and fine tuning of the camera 12.

FIG. 4 illustrates an exploded view of an embodiment of a drive assembly 79 constructed according to the principles of the present invention. The drive assembly 79 allows for the remote turning of the camera 12 about the mount axis 67 relative to the main support body (14 in FIGS. 1 and 2). Although only illustrated on one side of the camera 12, the illustrated motor assembly 79 preferably comprises two substantially identical drives, one coupled to each yoke arm 58. The drive assemblies 79 may be mechanically linked or electrically linked to ensure synchronous angular movement at each side of the camera 12. Each drive assembly 79 generally includes a drive motor 80 having a drive gear 81, at least one bearing 82 and a turning gear 83.

When incorporating a drive assembly 79, the yoke assembly 54 may be provided having yoke arms 58, including the associated pivot joint elements 62 as previously described but having a greater separation width across the mount axis 67 to accommodate the present drive components. Preferably, the yoke arms 58 provide a total spacing between each of the yoke arm pivot joint elements 62 and the opposing camera mounted pivot joint elements 64 of approximately ¾ inches. This spacing sufficiently accommodates the present motor drive assembly 79 without significant side movement along the mount axis 67. The yoke arms 58 may also be modified to include mounting brackets or holes for supporting each of the drive motors 80.

Preferably, each of the drive motors 80 utilizes similar power requirements as the camera 12 so that the existing power supply assembly (38 in FIGS. 1 and 2) may be used to provide the necessary power. A control switch is provided for operational control of the drive assembly 79. Together, the motors 80 are capable of turning a camera 12 mounted within the yoke assembly 54 smoothly and in precise increments, both clockwise and counter-clockwise. Preferably, each of these motors 80 may be a similar motor to that used to drive the camera focus and zoom components. However, other motors may be used, such as stepper motors. It should also be noted, that the illustrated embodiment could easily be modified to into a single motor drive assembly, either by simply eliminating a drive motor 80 on one side of the camera 12 or through the use of a single motor coupled to the pivot joints on both sides of the camera or even just coupled to a single location on the camera. However, a single motor drive may require a more powerful motor.

Each drive motor 80 is electrically coupled to the power supply assembly 38 and the control switch. The control switch is used to energize the drive assembly 79 and to turn the camera 12 about the common mount axis 67 and horizontal axis 75 relative to the Yoke assembly 54. Preferably, the control switch is a thumb switch having positions for both clockwise and counter-clockwise rotation of the motors 80 and mounted to the handle (48 in FIGS. 1 and 2). However, the control switch may be mounted anywhere, including a remote location or even be a remote controller which operates a secondary switch mounted somewhere on the support system 10.

As illustrated, the drive gear 81 coupled to each drive motor 80 engages a turning gear 83. The turning gear 83 is respectively and fixedly coupled to the camera 12 through a first interface 84. The first interface 84 mates with the pivot joint element 64 on the camera 12 to form a locking engagement. This engagement is secured with the tightening of the fastener 66. The turning gear 83 is also respectively coupled with the yoke arm 58. However, the bearing 82 and second interface 84' allows free rotation between the camera 12 and the pivot joint element 62 on the yoke arm 58. In particular, a first race of the bearing 82 is fixedly retained relative to the first interface 84. This is preferably accomplished through a press fit if the bearing into the first interface. The turning gear is also fixedly attached to the first interface 84. Preferably, this connection is made through fasteners. The second interface 84' is then fixedly retained to a second race on the bearing 82. Thus, the first interface 84 and the turning gear 83 may be rotated freely relative to the second interface 84'. This configuration allows the drive assembly 79 to maintain the camera 12 position relative to the yoke assembly 54 and to change that position through turning about the mount and common axes 67 and 75. This drive assembly configuration may easily be modified and many different configurations of gears, belts, couplings and motors can be used to accomplish the required function of automatically turning the camera 12 as is known to those of skill in the art.

Figure 5:
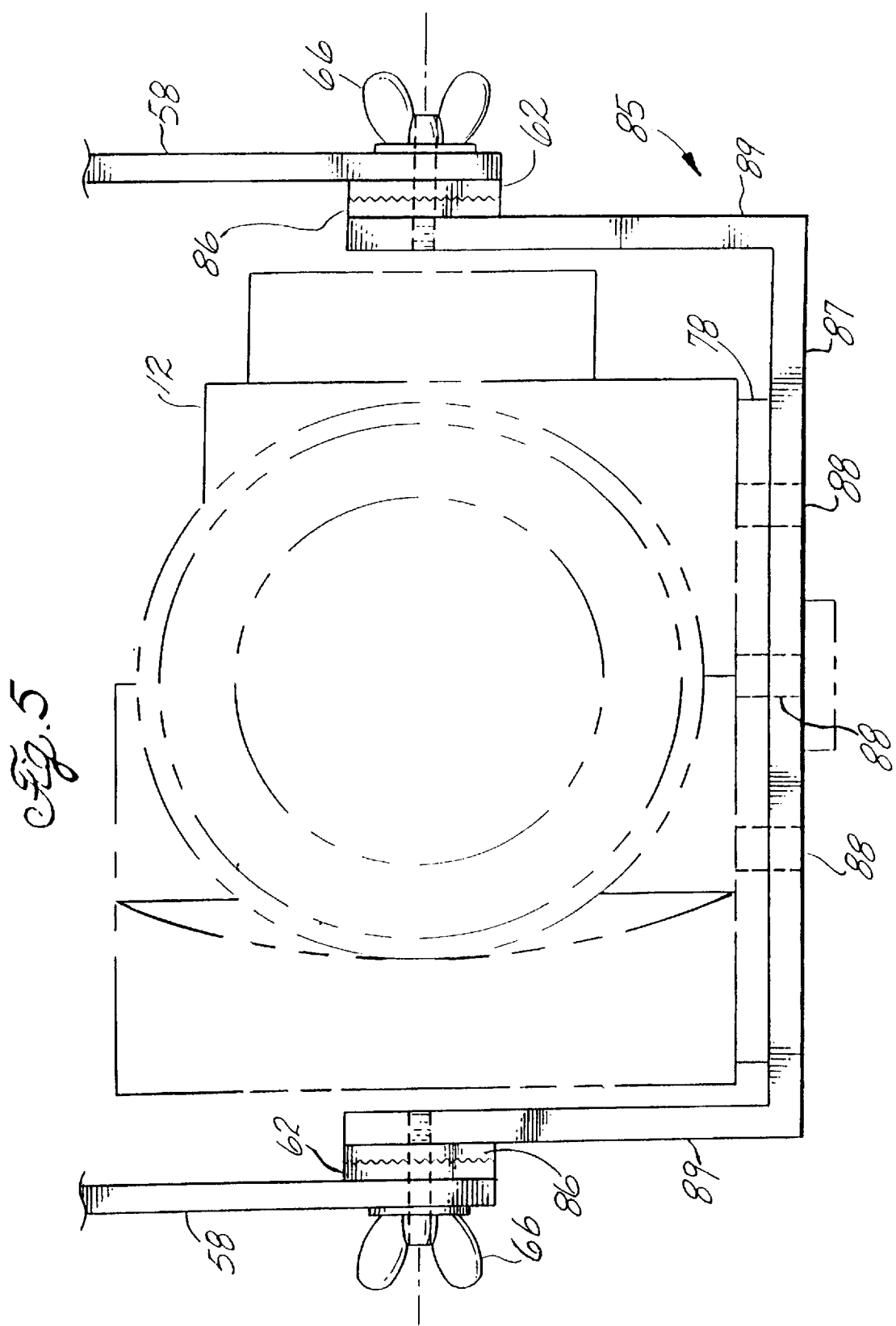
FIG. 5 is a front view of a camera mounting adapter constructed according to the principles of the present invention and attached to the yoke arms of the camera support system of the present invention.

Referring now to FIG. 5, a camera mounting adapter 85 may be fitted to a camera assembly 12 which allows the camera support system 10 of the present invention to be used with cameras 12 which are not otherwise capable or adapted to be supported about either side as previously described. In order to use these unmodified or otherwise bottom mountable cameras, the mounting adapter 85 is made from a generally U-shaped adapter plate which has pivot joints or pivot joint elements 86 attached to the outside surface of the opposing legs. The pivot joints 86 are directly coupled with the mating pivot joint elements 62 on the yoke arms 58 through a tightening fastener or similar device 66 as described in the side mounted camera 12. Thus, the pivot joint elements 86 and/or the side legs 89 each have a threaded hole for receiving the tightening fastener 66. The mounting adapter 85 allows the support system 10 to be used with most any industry or other motion picture camera, including those limited to a bottom mount.

More specifically, the camera mounting adapter 85 consists of a horizontal plate 87 with has a number of threaded holes 88 to ensure that most any camera 12 equipped with a standard mounting plate 78 can be secured to the mounting plate. Opposing legs 89 extend generally vertically upward and away from the mounting plate 87. At the distal ends of each of these legs 89 are half portions of pivot joints 86. These pivot joints 86 are configured to mateably couple with the pivot joints 62 mounted to the distal ends of the yoke arms 58. This allows the operator to mount almost any camera directly to the mounting adapter 85 via the conventionally positioned holes in the mounting plate 87. The mounting adapter 85, in turn, is attached directly to the yoke arms 58 by interfacing the pivot joints 86 attached to the vertical legs 89 to the pivot joints 62 permanently attached to the yoke arms 58.

Figure 6:
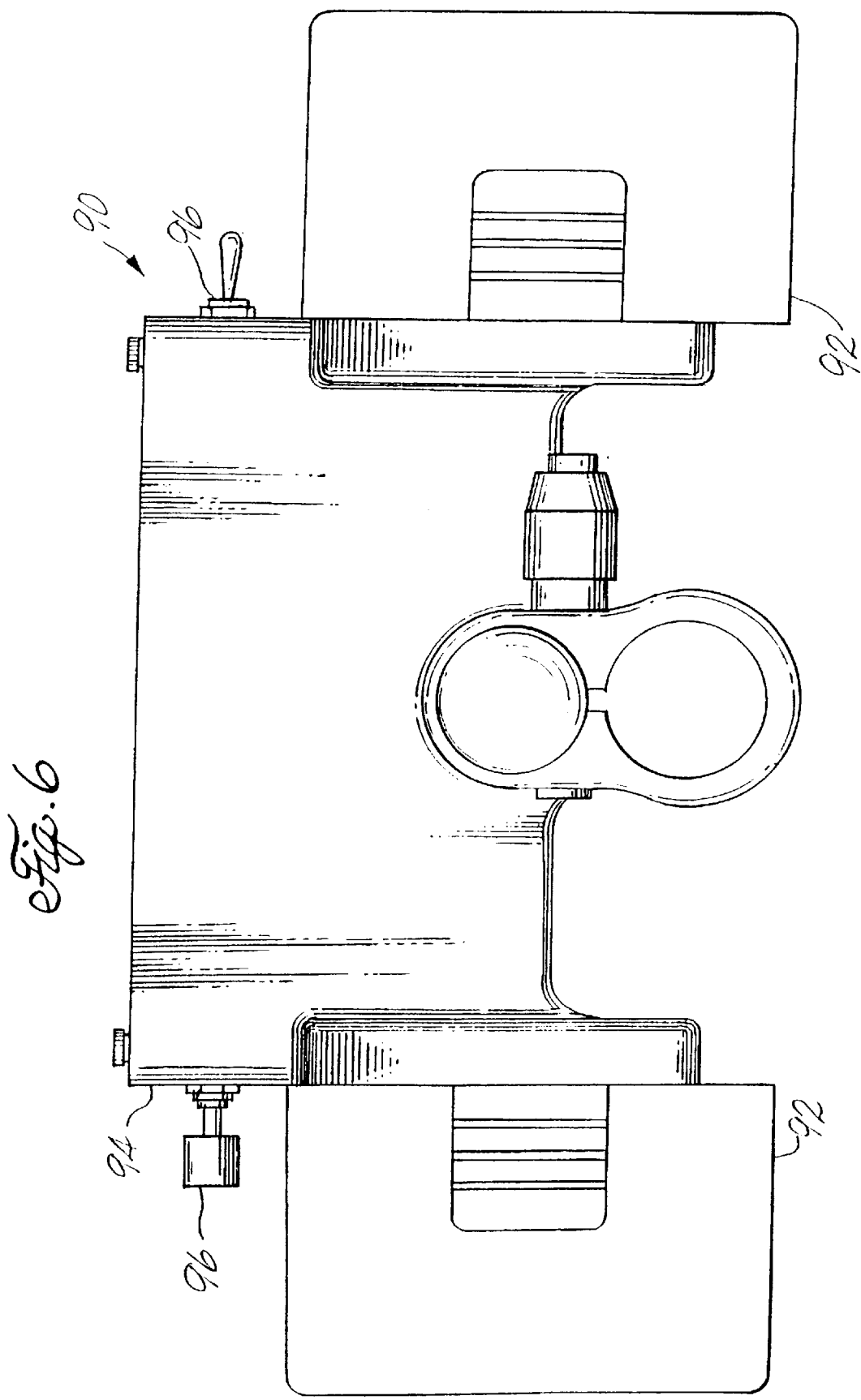
FIG. 6 is a top view of an embodiment of a power supply assembly constructed according to the principles of the present invention.
Figure 7:
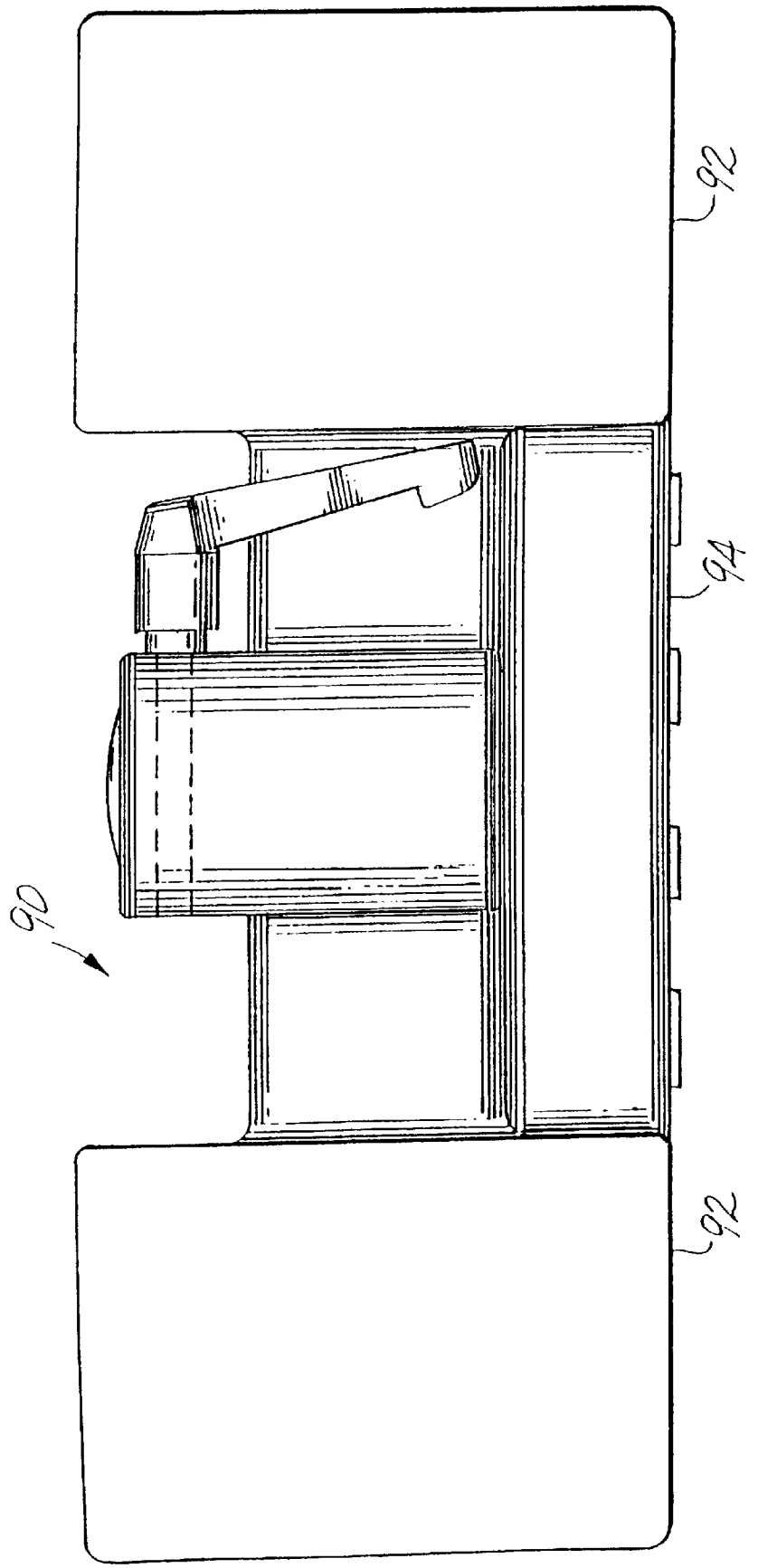
FIG. 7 is a side elevational view of the power supply assembly shown in FIG. 6.

Referring now to FIGS. 6 and 7, an alternate embodiment of a power supply assembly 90 will be described. In this embodiment, the power supply assembly 90, including the removably attached batteries 92 is much narrower and more compact than the previously described embodiment. This greatly reduces inertial effects such as the flywheel effect when the support system 10 and attached camera 12 is turned about the main support axis, for example, when the operator using the system must quickly navigate a sharp turn. This reduced inertial effect allows an operator to more precisely end the cornering maneuver by reducing the likelihood that the camera 12 and support system 10 will continue the turn beyond the point the operator has chosen as the end of the cornering maneuver.

The power supply assembly 90 includes an integral control panel assembly 94 which is mountable to the main support 14. Preferably, this version of the power supply assembly 90 utilizes removably attachable battery units 92 similar to those previously described. The control panel assembly 94 includes at least one electrical switch 96 for controlling power to the camera drive and to operate the camera accessories which may be included in the overall camera and support system.

Figure 8:
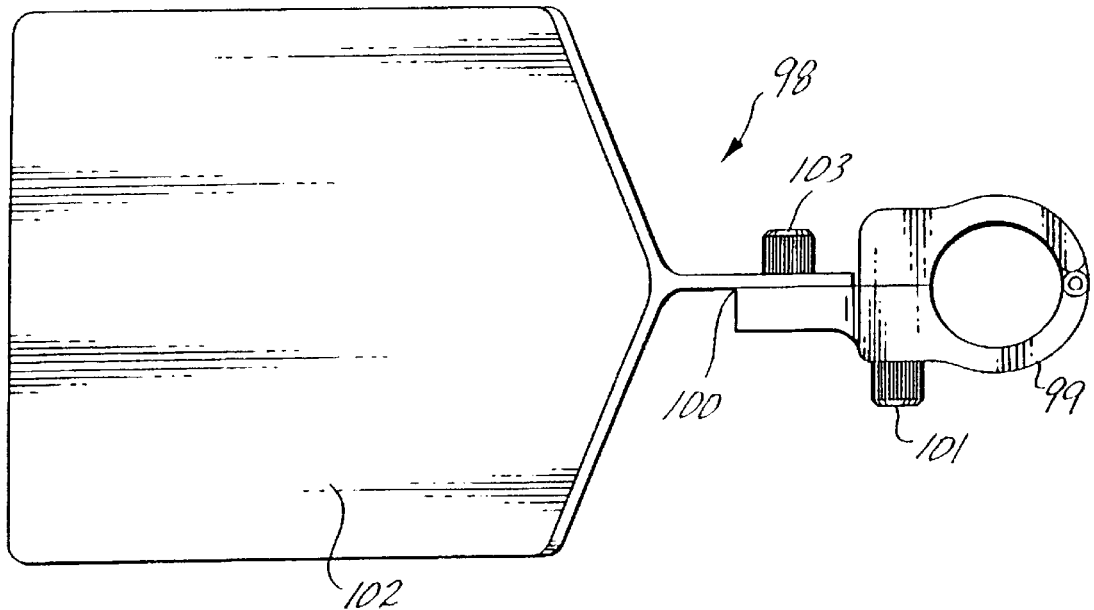
FIG. 8 is an enlarged top view of a monitor mount as shown in FIG. 1.
Figure 9:
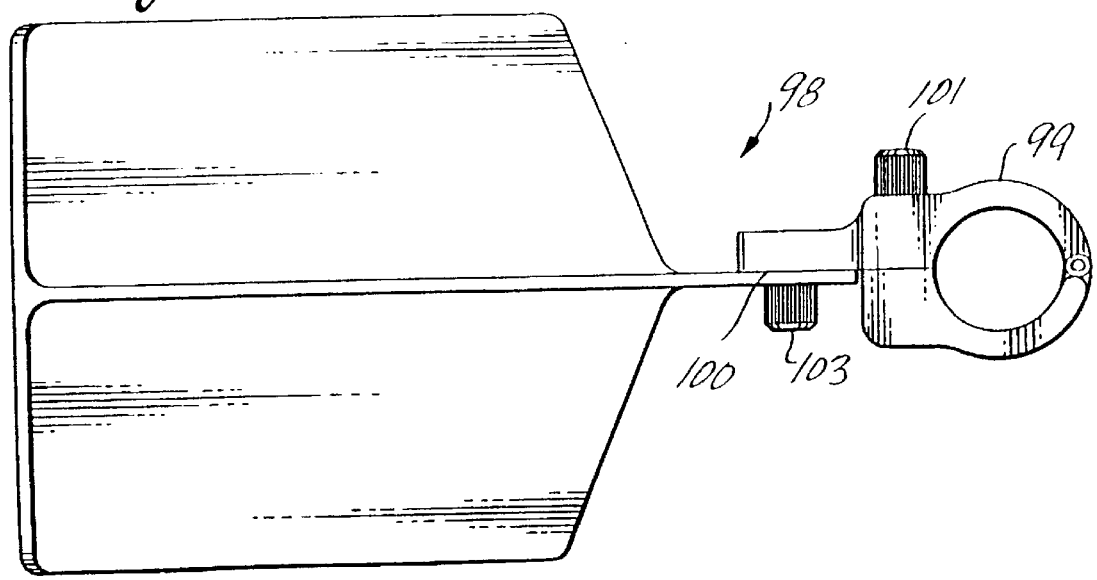
FIG. 9 is a bottom view of the monitor mount shown in FIG. 8.

FIGS. 8 and 9 illustrate an alternative embodiment of a viewer support mount 98. As previously discussed, the support mount 98 is coupled to an end of the main support 14. However, in this embodiment, there is no need for a pivot joint element, since the support mount 98 may be directly attached to the main support 14. This embodiment also eliminates the need for the upper end attachment 18. The support mount 98 includes a compressible sleeve 99 which is slidably movable along the upper length of the main support 14. A securing fastener 101 or similar device is used to reduce the diameter of the sleeve 99 and secure the mount 98 in position along the main body 14. This configuration allows for slidable positioning of the mount 98 along the main body 14. The support mount 98 is pivotable about integral joint 100 which may be loosened through a fastener 103 to adjust the angle and tightened to secure the angular position. This type of connection to the main support 14 may also be used to pivotally couple the yoke assembly 54 to the main support. As illustrated, the support mount 98 is constructed with a flat mounting surface 102. However, any type of surface or attachment means may also be used.

Referring now to FIGS. 10–14, a camera cage support 104 is illustrated. The cage 104 is used to support a camera 12 about the sides of the camera as previously described and thus, also eliminating the need for a bottom mount or support. The cage 104 is thus, an extended version of the yoke assembly 54 previously described. However, the cage support 104 is useable to rigidly support a motion picture camera 12 to most any foundational support.

Figure 10:
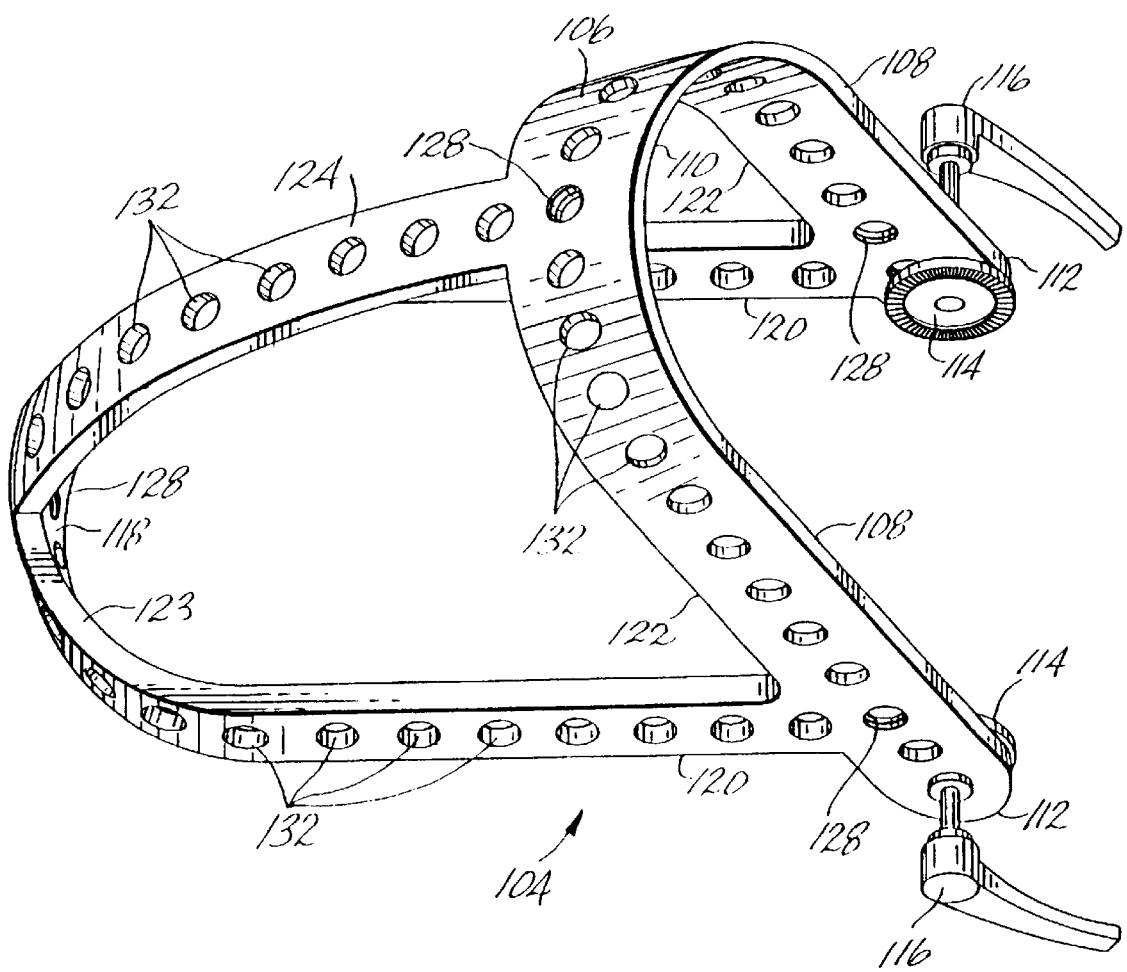
FIG. 10 is a perspective view of an embodiment of a camera support cage constructed according to the principles of the present invention.

The cage support 104 is preferably a single piece structure comprised of three primary structural portions as best illustrated in FIG. 10. The first primary portion is a first generally U-shaped support frame 106. The U-shaped frame portion 106 includes extension arms 108 which extend outward from the ends of a semi-circular portion 110. The extension arms 108 are preferably parallel to each other and equidistant from the bisecting line of the semi-circle. The extension arms 108 include distal rounded ends 112. The distance between the extension arms 108 (defining the diameter of the semi-circle) is sufficient to allow the motion picture camera 12 to be inserted between the arms without interacting with the cage 104. The width and thickness of the frame members are sufficient to adequately support the motion picture camera 12 once inserted and locked in place. Preferably, the cage support 104 is constructed from a metal, such as an aluminum or aluminum alloy.

Pivot joint elements 114 are mounted on the inner surface of each of the rounded ends 112 of the extension arms 108. The pivot joint elements 114 include surfaces which mateably interact with the respective pivot joint elements 64 attached to the sides of the motion picture camera 12 as best illustrated in FIG. 3. Preferably, the pivot joint elements 114 and 64 are mating pivot joint elements. Threaded tightening levers or fasteners 116 are interactively connected to the pivot joint elements 114 and positioned on the outer surface of each of the extension arms 108. When the camera 12 is inserted into the cage support 104, the tightening levers 116 are rotated to engage the respective pivot joint elements 114 attached to the ends of the extension arms 108 and the pivot joint elements 64 attached to the camera 12. The levers 116 are tightened sufficiently to provide sufficient pressure/force to securely attach the camera 12 to the cage support structure 104.

The second primary structural portion of the cage-support is a second generally U-shaped frame member 118. Similar to first U-shaped frame member 106, the second frame member 118 is essentially U-shaped, and includes a first semi-circle portion and extension arms 120 which extend outwardly from the semi-circle portion. Preferably, the extension arms 120 of the second U-shaped frame member 118 also extend outwardly from an inner side edge 122 of the first U-shaped frame member 106 at a location spaced from the distal ends 112 of the first extension arms 108. This location is approximately equal to the diameter of the pivot joint elements 114. Preferably, the angle formed between the joining of extension arms 108 and 120 is less than 90 degrees and angle outside the arms is greater than 90 degrees. However, an angle of approximately 90 degrees may also be preferred. The width, thickness and material of the second frame member 118 may preferably be the same as that of the first frame member 106.

A third primary structural portion of the cage support 104 is an arced frame member 124 connecting the first and second U shaped frame members 106 and 118. The third frame member 124 extends from the inner side edge 122 of the first U-shaped frame member 106, at the apex of the defined semi-circle, to an inner side edge 123 of the second U-shaped frame member 118, at the apex of the respective semi-circle. The width, thickness and material of the third frame member 124 is preferably the same to that of the other frame members 106 and 118. When assembled, the outer edges of the third frame member 124 are equidistant from the center points of the apex of the semi-circles defined by the first and second frame members 106 and 118.

Figure 11:
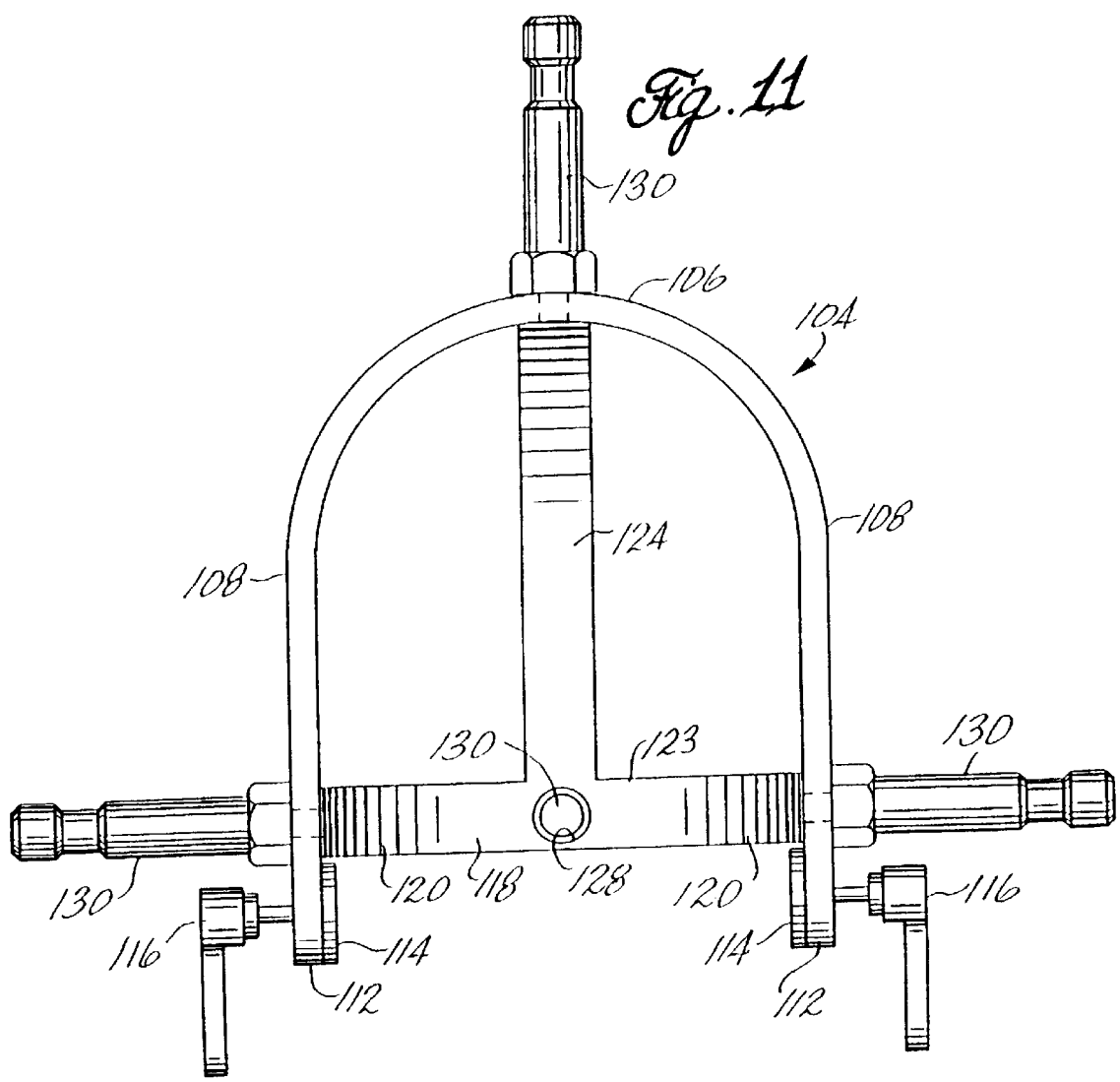
FIG. 11 is a front view of the camera support cage shown in FIG. 10.
Figure 12:
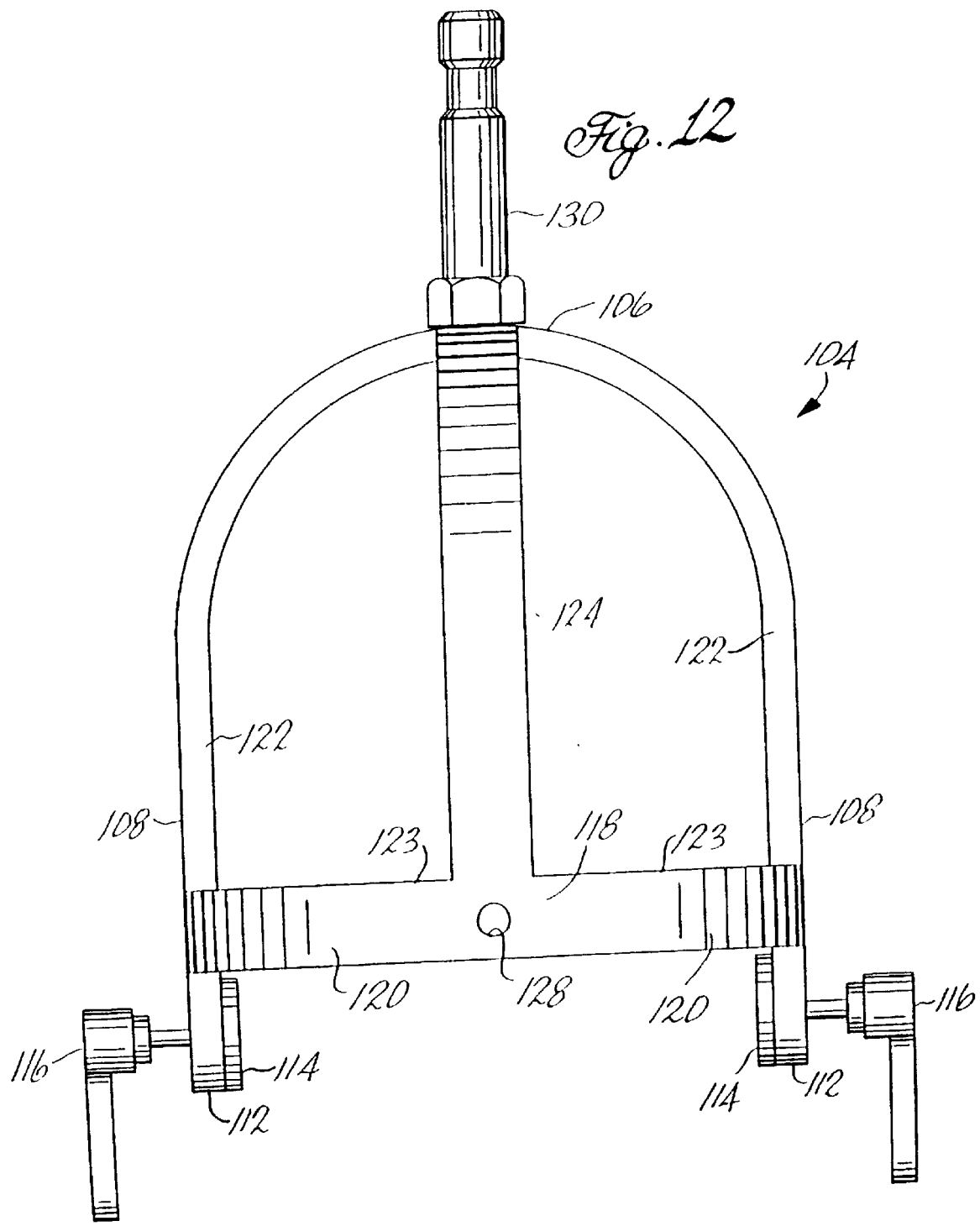
FIG. 12 is a rear view of the camera support cage shown in FIGS. 10 and 11.

The cage support 104 has at least four apertures 128 for receiving structural connecting pins 130, as best illustrated in FIG. 11. Preferably the apertures 128 are tapped to receive standardized threaded connecting pins commonly used in the motion picture industry, but the apertures may be of any size or type desired and are only limited only by the width of the structural frame members 106, 118 and 124. Preferably the centers of each of the apertures 128 is located an equidistance from the outer edges of the frame members 106, 118 and 124. To reduce weight and to offer other optional attachable points to the cage support 104, additional apertures 132 may be formed along the length of any or all of the frame members 106, 118 and 124. The number of additional apertures 132 that can be added is only limited by the necessary structural integrity of the cage support 104.

The connecting pins 130 are attached to the apertures 128 at desired locations depending upon the desired support and available foundational structure. Preferably, the connecting pins 130 are threaded into threaded apertures 128 with sufficient torque to be securely attached and to prevent inadvertent removal. This configuration allows easy removal and repositioning of the connecting pins 130. The connecting pins 130 are preferably solid metal rods having a first threaded end and a second non-threaded end. The threaded end preferably defines ⅜" (9.53 mm)×16 threads and has a nominal diameter of ⅝" (15.88 mm) except where the pin defines a hexagonal, nut-like torquing collar adjacent the threads, and except near its other end where the pin is of reduced diameter. The preferred connecting pins 130 are devices which are commonly used for supporting camera systems in the motion picture industry and are known as "baby pins".

Figure 13:
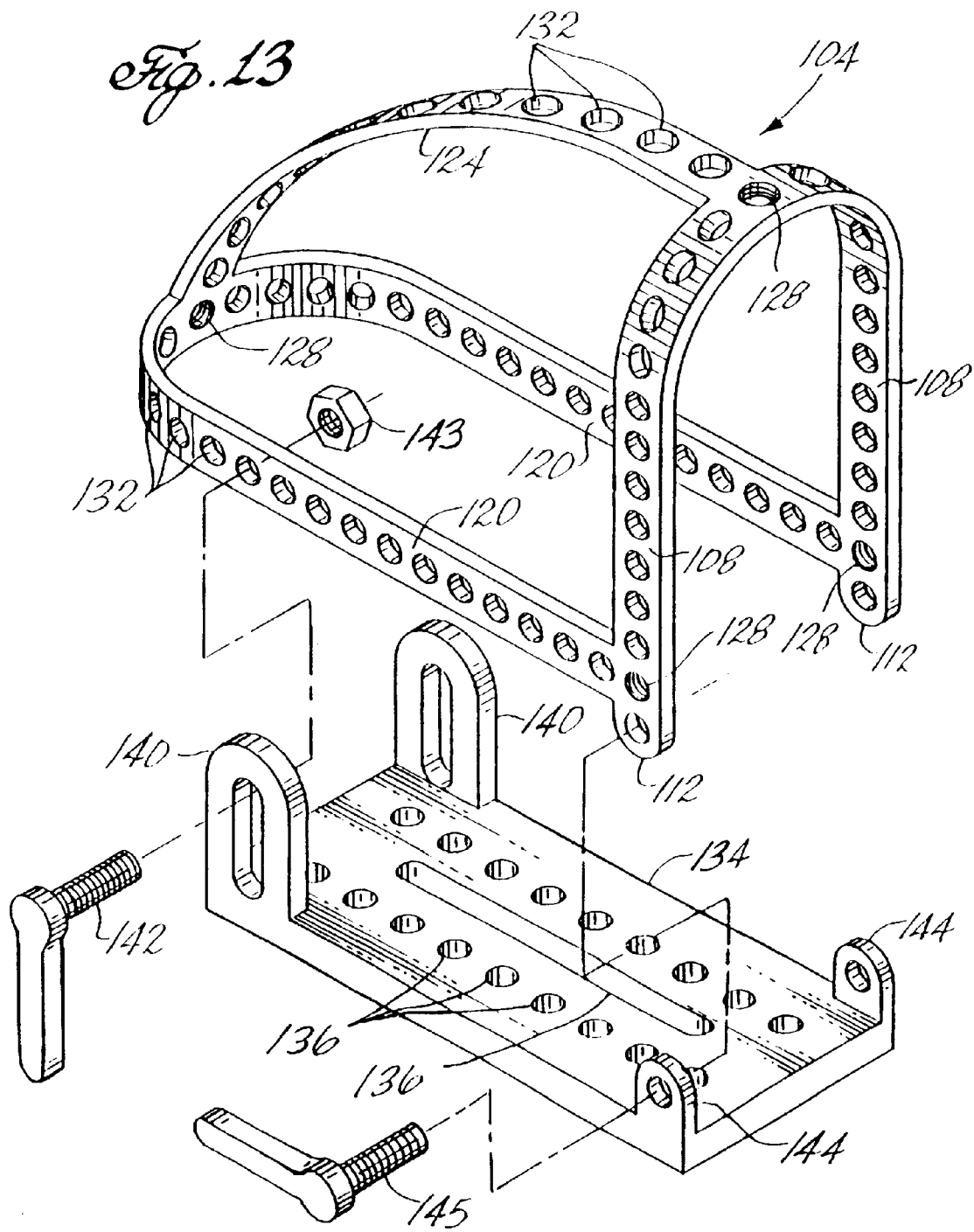
FIG. 13 is a perspective view of a camera support assembly, including an embodiment of a camera support base constructed according to the principles of the present invention.
Figure 14:
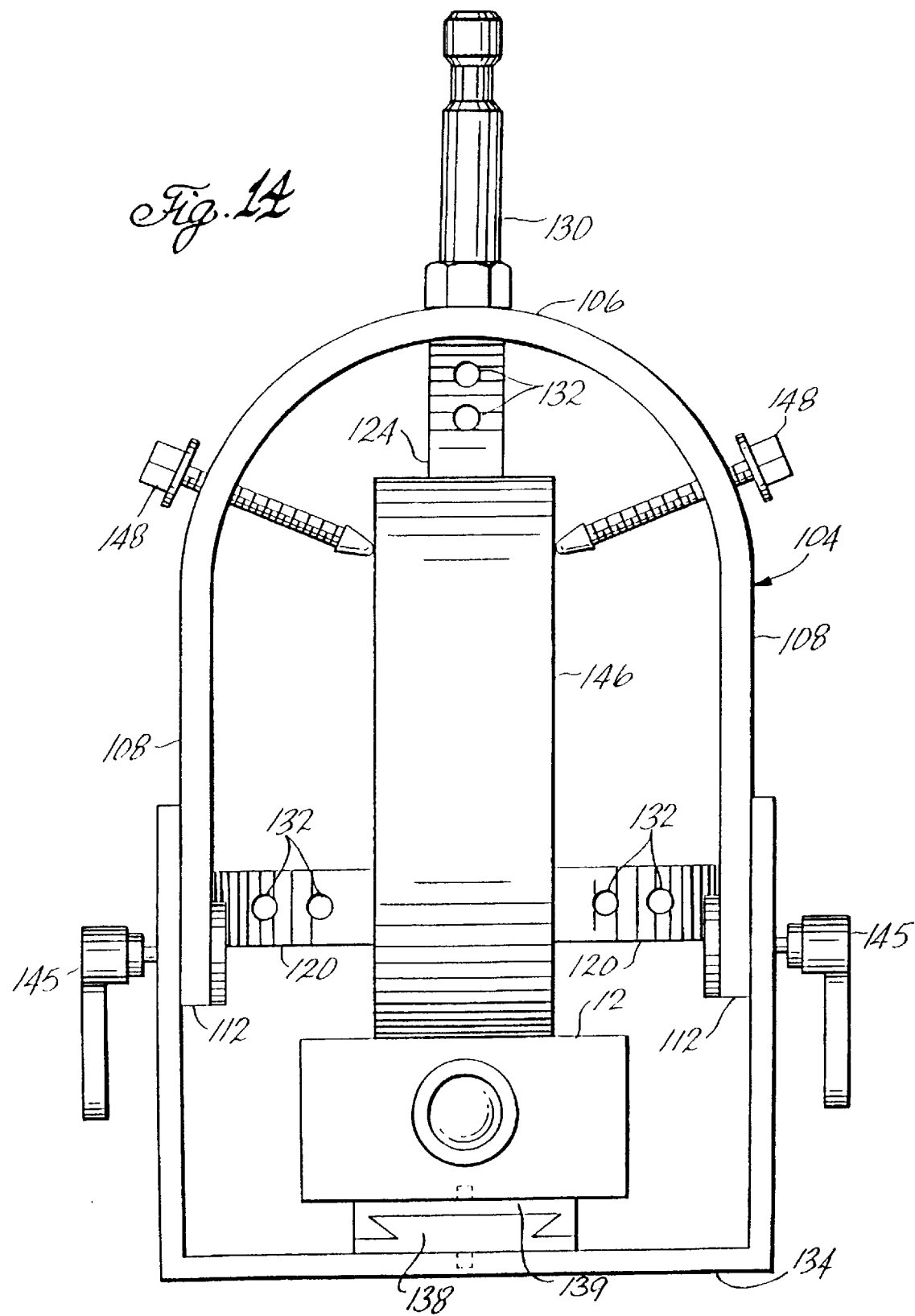
FIG. 14 is a front view of a standard motion picture camera supported within the camera support cage and base as shown in FIG. 13.

Referring now in particular to FIGS. 13 and 14, the cage support 104 may be adapted to support any type or size camera 12. More specifically, the cage support 104 may be adapted to receive a base plate 134 which is adapted to mount to the bottom of the camera 12 which is not otherwise capable of being side mounted or has not yet been fitted with side mounted pivot joints or pivot joint elements 64. Similar to the support plate 78 previously described, the base plate 134 is configured with a plurality of holes or slots 136 for connection with the bottom of the camera 12. The base plate 134 may also be fitted with a special mounting device 138 for particular camera applications, as best illustrated in FIG. 14. This specialized mounting device 138 may include an opposing plate 139 which is mounted to the camera 12 and which forms a dovetail connection. Such plates are commonly used in camera mounting systems in the motion picture industry. Preferably, the base plate 134 is constructed from a lightweight structural material such as an aluminum.

FIG. 13 shows how a bottom-mounted camera 12 can be adjustably supported within the cage support 104 through use of the base plate 134. The base plate 134 includes a pair of elongated rear legs 140, each having elongated slots for adjustable connection with the rear portion of the cage support 104. These elongated legs 140 may be conventionally secured to the cage support 104 using any type of fastener assembly, such as through a lever arm fastener 142 threaded into a nut 143 secured to the cage support 104, or even through a standard fastener and nut assembly. The angular relation of the base plate 134 to the cage support 104 may be adjusted about a pivot axis formed between the front of the cage support and front arms 144. This adjustability allows the elevation angle or tilt of a camera 12 in the cage support 104 to be fine tuned. The front arms 144 are pivotally coupled to the lower end of frame arms 108 through a fastener 145 similar to the rear fastener 142.

FIG. 14 shows one embodiment of stabilizing support for the bottom-mounted camera 12 having an attached film magazine 146. Support and vibration control is accomplished through a plurality of screws 148 having soft tips and threadably supported through suitably located tapped holes in the cage-support 104. The soft-tipped threaded screws 148 are adjusted in the cage support 104 so their soft ends bear upon opposite sides of the camera's film magazine 146 to stabilize the camera 12 against vibration or deflection.

Figure 15:
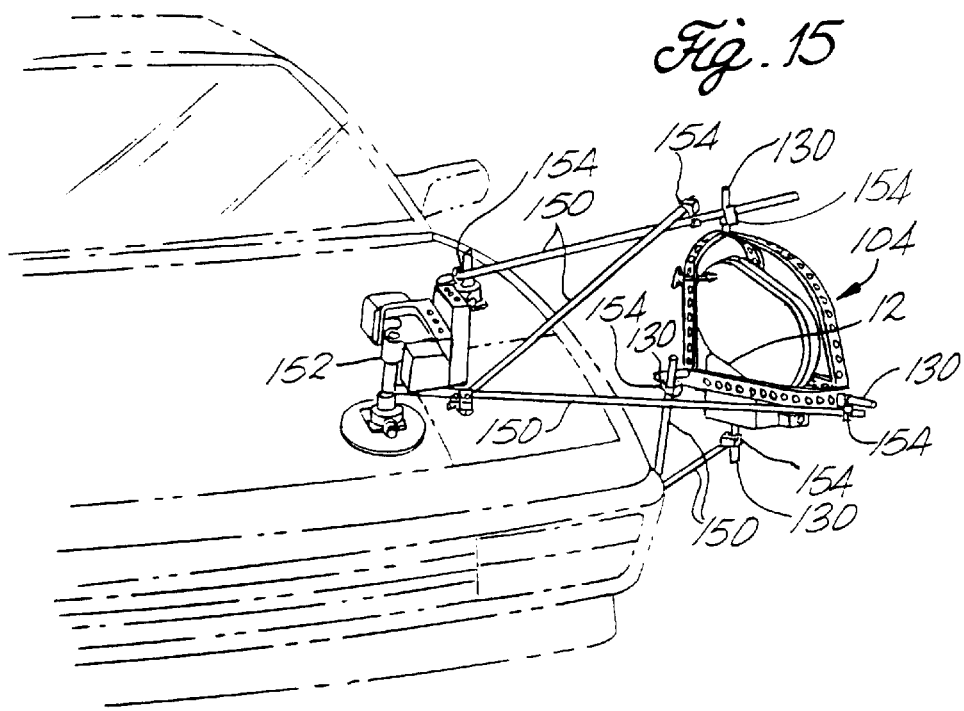
FIG. 15 is a perspective view of a camera support system of the present invention supporting a motion picture camera on a vehicle.

Referring now to FIG. 15, the camera support cage 104 is shown attached to a suitable foundation, in this case, an automobile. However, this foundation could just as easily be a motorcycle, bicycle, or other vehicle, an overhead or cantilevered crane or any other object to which the camera is to be secured. Prior to attachment to the foundation, the camera 12 is preferably securely attached within the cage support 104. The cage support 104 is particularly well suited for incorporating at least one drive motor assembly between the sides of the camera and the pivot joint on the support cage 104 as previously described. The drive motor assembly advantageously allows the camera 12 to be tilted or otherwise adjusted during filming or when an operator would otherwise not have convenient access.

Connecting pins 130 mounted to the support cage 104 provide locations whereby the cage and the secured camera 12 can be attached and secured to a foundation of suitable stability through a plurality of support rods 150 or similar devices. The support rods 150 may be simple shafts of structural material capable of rigidly supporting both the weight and position of the cage support 104 and camera 12. Preferably, the support rods 150 are constructed of tubing, such as ⅝ inch aluminum tubing, type 20–21, as commonly used in the motion picture industry for supporting camera assemblies. The tubing 150 may be of any desired length and may be treated or finished such as by anodization.

The support rods 150 are connected between connection pins 130 on the cage support 104 and suction cup mounts 152 applied to the automobile at such locations that the cage support has at least three connections via the support rods to spaced locations on the automobile. The use of three support rods 150 allows for a 3 point triangularized support of the cage support assembly 104. As an alternative to the suction cup mounts 152, clamps or other fastening devices may also be used. The support rods 150 are adjustably mounted to both the connecting pins 130 and the support rods through an adjustable connecting device 154.

Figure 16:
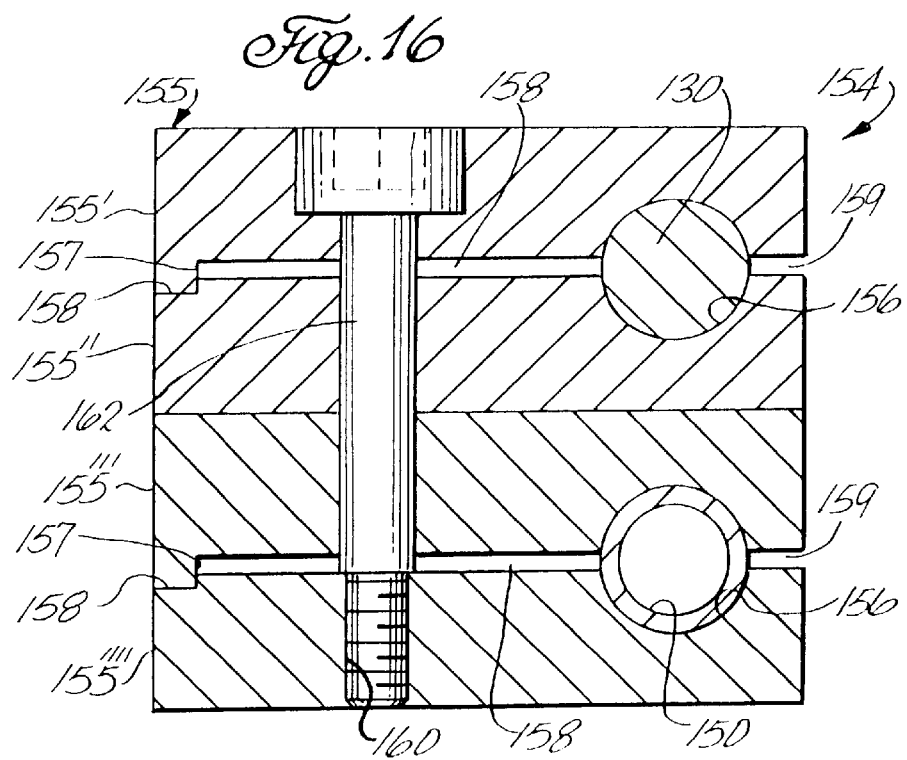
FIG. 16 is a cross-sectional view of an embodiment of a camera support connecting device constructed according to the principles of the present invention.

FIG. 16 shows an exploded view of a preferred embodiment of the adjustable connecting device 154 used to connect connecting pins (130 in FIG. 15) to the support rods (150 in FIG. 15) extending from a secured foundation. Preferably the connecting device 154 comprises a pair of clamps defined by a stacked assembly of four cubical or rectangular clamping blocks 155. Preferably, these clamps are made from a structural material such as a metal, and more preferably, from an aluminum such as a 20–24 aluminum which has been anodized. Each block 155 is fitted with a semi-circular recess 156 having a radius of curvature of approximately that of the structural support rods and connecting pins. The four blocks 155 form two pairs of clamps, each clamp composed of opposing blocks and each clamp rotatable relative to the other clamp.

More particularly, a first clamp is formed from an upper block 155' which is placed against a first inner block 155" such that the semi-circular recesses are opposed. The upper block 155' includes a fulcrum 157 which extends distally from the inner surface of the upper block and fits into a groove 158 formed in the first inner block 155". This configuration forms a slot 159 between the opposing upper block 155' and the first inner block 155". The slot 159 has a width substantially less than the diameter of the opposing semi-circular recesses 156. The opposing semi-circular recesses 156 form a cylindrical clamping surface having a diameter substantially similar to the diameter of the structural support rods, connecting pins or other support components. Preferably, the diameter of the semi-cylindrical recesses, including the width of the slot 159 formed when the blocks 155' and 155" are parallel, is approximately ⅝ inches. This configuration conforms to the support rods and connecting pins as commonly used in the filming industry.

Mounted adjacent the upper block 155' and the first inner block 155", is a second clamp made from a second inner block 155''' and a lower block 155''''. The second clamp (15''' and 155'''') is constructed similarly to the first clamp (155' and 155") and includes opposing semi-cylindrical recesses 156' spaced apart by a fulcrum 157' and groove 158' to form a slot 159'. Preferably, the second inner block 155''' is substantially flat against the first inner block 155" and capable of slidable movement thereagainst.

A common fastener hole 160 extends through the blocks 155. This fastener hole 160 is adapted for receiving a fastener 162. The fastener hole 160 is drilled or otherwise formed through each of the blocks 155 between its sides and perpendicular to the slots 159 therebetween. The fastener hole 160 is preferably formed in each block 155 about midway between the respective semi-circular recess 156 and block end. The fastener hole 160 in the upper block 155' may be fitted with a counter sunk portion for countersinking the fastener 162. The fastener hole 160 within the inner blocks 155" and 155''' may be a smooth hole of a diameter slightly larger than the fastener 162. The fastener hole 160 within the lower block 155'''' may be threaded along a portion of its distal length for threadable engagement with the fastener 162.

The fastener 162 provides a common pivot axis about which the first clamp (155' and 155") can swivel relative the second clamp (155''' and 155''''). When threadably actuated the fastener 162 forces opposing blocks 155 and their respective opposing semi-cylindrical recesses to compress together about each of the respective fulcrums 157. This compression of the recesses 156 acts to clamp any structural components, such as a support rod 150 or connecting pin 130, within the reducing diameter recesses. Tightening the fastener 162 also clamps the blocks 155 and thus, the clamps in place relative to each other. Since the two clamps are otherwise rotatable relative to each other about the bolt 162 before they are clamped together, the support components (pins or rods) received in the opposing recesses 156 can have any angular relationship desired within a plane normal to axis of the fastener 162. Also, the components are rotatable within the respective opposing recesses 156 and 156' before being clamped, so that the support components can have variable angular relations which are fixed when the connecting device 154 is secured. The fastener 162 is preferably an Allen head machine screw, with its head recessed in the countersunk portion of upper block 155'.

Referring now to FIGS. 17–19, an embodiment of a clamp device 165 adapted for use with the connecting pins 130, support rods 150 and connection devices 154 of the present invention is illustrated. The clamp device 165 includes a lower clamp arm 166 and an opposing upper clamp arm 168. Each arm 166 and 168 is pivotally coupled to a common rear or pivot point 170 and extends to a respective jaw end 172.

The upper clamp arm 168 extends from the rear pivot point 170 where it is configured as a yoke 173 to receive the rear end 170 of the lower clamp arm 166. The upper clamp arm 168 extends from the yoke 173 along a first direction to a transitional portion 174 formed along the clamp arm. This transitional portion 174 is preferably closer to the jaw end 172 than the yoke 173. The upper clamp arm 168 then extends from the transitional portion 174 to the jaw end 172 along a second direction. This change in direction forms an inwardly facing jaw end 172. The lower clamp arm 166 may be configured with a similar shape and similarly located transition portion 174.

The upper clamp arm 168 is fitted with a slot 176 located between the transitional portion 174 and the pivot end 170. The slot 176 provides an opening through the upper clamp arm 168 which exposes an inner surface of the lower clamp arm 166. The lower clamp arm 166 is fitted with a fastening nut 180 which is carried within the body of the lower clamp arm opposing the slot 176 in the upper clamp arm 168. The fastening nut 180 is adapted for swivel action about an axis parallel to the axis of the pivot 170 at the rear end of clamp arms 166 and 168. A clamping actuator 178 extends through the slot 176 and is threadably engaged, diametrically through, the fastener nut 180. The clamping actuator 178 includes a shouldered region for bearing against the upper clamp arm 168 adjacent the slot 176. The clamp arms 166 and 168 are forced together through threadable actuation of the clamping actuator 178 with the fastener nut 180.

The clamping actuator 178 may comprise a threaded shaft having a handle 182 to facilitate clamping actuation, as best illustrated in FIG. 18. The handle 182 may be in the form of a baby pin or connecting pin 130, as best illustrated in FIG. 17. Alternatively, the actuator 178 may be made from a threaded shaft having a combination handle 182, including a connecting pin 130, as best illustrated in FIG. 19. The use of a connecting pin allows the clamp to be readily secured to support components as previously described. A locking device, such as a lock nut, may be provided to ensure the clamping actuator is not loosened during use. A separate connecting pin 130 may be secured to the lower clamping arm 168 to provide an additional location to attach support components, such as the swivelable connecting device illustrated in FIG. 16.

Preferably, the clamp device 165 is constructed of a lightweight structural material and more preferably is made from an aluminum alloy such as 70–75 aluminum. The clamp device 165 is adapted for use in tight locations where access and space are limited. In addition each of the opposing jaws 172 is slightly angled inwardly to facilitate clamping around smaller tubular members of various diameters, such as tubular bike frames. To protect the clamping surface of support structure, elastomeric pads may be provided on each of the jaw ends 172. These pads, which may be rubber covers or plastic boots, fit over the jaw ends 172 to provide a cushioned and protective surface. The pads may also be adhered to the contacting surface of the jaw end 172.

While we have described the present invention in the context of conventional motion film picture cameras, it will be understood that the present invention is compatible with all types of cameras, including both film and video cameras. It will also be understood that various modifications can be made to the disclosed embodiments of the present invention without departing from the scope and spirit thereof. For example, various sizes and differing configurations of the camera support system are contemplated as well as various sizes for the components. Also, various modifications may be made to the configuration of the parts and their interaction. Therefore, the above description should not be construed as limiting the invention, but merely as an exemplification of preferred embodiments thereof. Those of skill in the art will envision other modifications within the scope and spirit of the present invention as defined by the appended claims.

What is claimed is:

1. A positionally adjustable side mounting arrangement in combination with a movable dynamic image camera having a body with top, bottom and side surfaces and an optical axis extending in a front-to-back direction within the body, the mounting comprising:

a pair of first coupling moieties fixedly carried by respective side surfaces of the body and disposed in alignment with a mount axis which lies between the body top and bottom surfaces and is substantially normal to the optical axis, each first coupling moiety having a contoured surface which is cooperable with a similarly contoured mating surface of a related second coupling moiety and having plural discrete stable angular mated relations with the second coupling moiety about the mount axis.

2. A mounting arrangement according to claim 1 wherein the first and second coupling moieties comprises a pair of mateable elements having cooperating surface features defining a plurality of stable positions of one element angularly relative to the other element.

3. A positionally adjustable mounting arrangement in combination with a movable dynamic image camera which has a body with top, bottom and opposite side surfaces and an optical axis which extends in a front-to-back direction within the camera body, the mounting comprising:

a pair of first coupling moieties and a pair of second coupling moieties which have plural angularly discrete stable matable relations with the first moieties,
the first coupling moieties being affixed to the opposite sides of the body in alignment with each other along a mount axis which lies between the body top and bottom surfaces and which is substantially normal to the optical axis,
the second coupling moieties being mountable to spaced portions of a desired camera support for mating contact with the first coupling moieties.

4. A mounting arrangement in combination with a movable dynamic image camera which has a body with top, bottom and opposite side surfaces and an optical axis which extends through the body in a front-to-back direction within the camera body, the mounting comprising:

a pair of first coupling moieties and a pair of second coupling moieties which are stably matable with the first moieties,
the first coupling moieties being affixed to the opposite sides of the body,
the second coupling moieties being mountable to spaced portions of a desired camera support for mating contact with the first coupling moieties, and
a fastener cooperable with each set of first and second coupling moieties operable to secure the moieties of the set in mated contact with each other.

5. A positionally adjustable mounting arrangement in combination with a movable dynamic image camera which has a body with top, bottom and opposite side surfaces and an optical axis which extends through the body in a front-to-back direction within the camera body, the mounting arrangement comprising:

a pair of pivot joint members affixed respectively to opposite sides of the camera body in alignment along a pivot axis which is substantially normal to the optical axis, the pivot joint members being releasably securable to spaced portions of a desired camera support to be secure from motion about the pivot axis in a manner which applies no appreciable loads to the camera body along the pivot axis.

6. A mounting arrangement according to claim 5 in which each pivot joint member defines a component of a releasable fastener connection by which the pivot joint member can be clamped relative to the respective portion of the camera support.

7. A mounting arrangement according to claim 6 in which the releasable fastener connection is a threaded fastener connection.

8. A mounting arrangement according to claim 5 in which each pivot joint member comprises a member which, as mounted to the camera, has a surface facing away from the camera in which are defined a tapped hole and a plurality of alternating crests and valleys extending radially from the hole.

9. A mounting arrangement according to claim 5 including a camera mount yoke having a pair of spaced and coaxially aligned camera support portions with which the pivot joint members are supportively engageable in a selected stable angular relation of the camera relative to the yoke about the pivot axis.

10. A mounting arrangement according to claim 9 including a camera support post, and a releasable yoke pivot connection between an end of the post and the camera mount yoke at a location on the yoke which is centrally between the yoke camera support portions, the yoke pivot connection having a pivot axis disposed substantially parallel to the pivot axis through the camera body.

11. A mounting arrangement according to claim 10 wherein the camera is electrically powered and including an electrical storage battery mounted to the post in spaced relation to the yoke, and a manually engageable load carrying handle secured to the post between the battery and the yoke by which a camera operator can support and carry the arrangement.

12. A mounting arrangement according to claim 11 in which the arrangement has a center of gravity located between the camera and the battery, and the handle is adjustably securable to the post for location as desired along the post relative to the arrangement center of gravity, including substantially above the center of gravity and substantially at the center of gravity.

13. A mounting arrangement according to claim 5 including a camera mount yoke having spaced camera support portions between which the camera is supported via the pivot joint members for rotation about the pivot axis, and a motor operatively connected between the yoke and the camera for rotating the camera about the pivot axis.

14. A hand carryable portable support system for a dynamic image camera, the camera support system comprising:

an elongate main support member extending along a principal axis between a first end and a second end;

a first attachment end connected to the first end of the main support member;

a second attachment end connected to the second end of the main support member;

a handle connectible to the main support member at a selected variable location along the length of the main support member for hand-held support and carriage of the system;

a power supply secured to the main support member at a selected variable location along the length of the main support member and electrically connectible with a camera supported by the support system; and a camera support yoke coupled to the second attachment end through a first adjustable and fixable pivot joint having a first pivot axis which is generally perpendicular to the principal axis, the support yoke having opposing spaced yoke arms adapted at ends thereof for adjustable and fixable pivotable connection with a supported camera along a second pivot axis disposed parallel to the first pivot axis;

wherein a supported camera connected to the yoke via the second pivot axis may be tilted about the second pivot axis and the yoke may be pivoted at the first pivot joint about the first pivot axis with respect to the main support member to establish a desired positional relation between the first axis and the center of mass of the yoke and of the camera and related devices supported in the yoke.

15. A portable camera support system according to claim 14, and further comprising a camera pivotally connected to each of the opposing yoke arm ends through a pair of fixable second pivot joints, each of said second pivot joints including a pivot joint member mounted to a respective side of the camera body along said second pivot axis.

16. A portable camera support system according to claim 15 wherein each of said first and second pivot joints comprises a pair of mateable elements having cooperating surface features defining a plurality of stable positions of one element angularly relative to the other element.

17. A portable support system according to claim 14, and further comprising a camera support base for connection with a base of a supported camera, said support base having opposing sides, each of said opposing sides and the yoke arm ends comprising the second pivot joints.

18. A portable camera support system according to claim 14 wherein the main support member may be oriented with a supported camera in an upper position for a first camera operation and with the camera in a lower position for a second camera operation.

19. A portable support system according to claim 14, and further comprising at least one motor operatively associated with the second pivot axis for angularly displacing about the second pivot axis a camera supported by the yoke arms.

20. A camera support cage for receiving a camera and for mounting the camera to a support structure, the camera support cage comprising a first generally U shaped frame member having a pair of spaced distally extending first legs to each of which is mounted a corresponding one of a pair of coaxially aligned and opposing pivot joint elements;

a second generally U shaped frame member having a pair of spaced distally extending second legs which are substantially perpendicular to the first legs and the ends of which are attached to a respective first leg;

camera mounting means cooperable with the pivot joint elements for supporting a camera between the first and second frame member legs and affording pivotal movement of the supported camera about the axis on which the pivot joint elements are aligned.

21. A camera support cage according to claim 20 and further comprising a base plate carrying a pair of further pivot joint elements cooperable respectively with a corresponding pivot joint element on the respective first frame member, and wherein said base plate is conventionally connectible to the base of a supported camera for supporting the camera within the support cage.

22. A camera support cage according to claim 20 in combination with a plurality of attachment devices which are fixedly connectable to the support structure, and a plurality of structural connections connectable between the camera support cage and the attachment devices.

23. A camera support cage according to claim 22 wherein the structural connections include tubular members, structural connecting pins securable to the cage, and swivelable and fixable couplings cooperable between the tubular members and the connecting pins.

24. A camera support cage according to claim 22 wherein the support structure is a vehicle.

25. A clamp assembly, useful in the motion picture industry, comprising first and second clamp arms hingeably connected to each other at respective first ends of the arms and defining at opposite second end portions cooperating jaw configurations adapted at the ends thereof for gripping opposite sides of a nontubular article and adapted adjacent to and inwardly from the ends for gripping a tubular article, an externally threaded shaft extending loosely through the first clamp arm into engagement with an internally threaded element carried by the second arm intermediate its ends for rotation about an axis parallel to the axis of the hingeable connection between the arms, an actuating handle carried by the shaft adjacent the first arm and defining a shoulder abuttable with a surface on the second arm which faces away from the second arm, there being at least one structural connecting pin of baby pin configuration and dimensions connected to the clamp assembly in spaced relation to the hingeable connection between the clamp arms.

26. A clamp assembly according to claim 25 in which the structural connecting pin defines the actuating handle.

27. A clamp assembly according to claim 25 in which the structural connecting pin is connected to the second clamp arm and extends therefrom in a direction away from the first clamp arm.

* * * * *